United States Patent

Yakushiji et al.

[11] Patent Number: 5,870,301
[45] Date of Patent: Feb. 9, 1999

[54] SYSTEM CONTROL APPARATUS INCLUDING A MASTER CONTROL UNIT AND A SLAVE CONTROL UNIT WHICH MAINTAIN COHERENT INFORMATION

[75] Inventors: Hiroshi Yakushiji, Miyakonojo; Tomoko Osaki, Yokohama; Reiko Sato, Kawasaki; Masato Iwawaki, Machida, all of Japan

[73] Assignee: Fujitsu Limited, Kawasaki, Japan

[21] Appl. No.: 588,006

[22] Filed: Jan. 17, 1996

[30] Foreign Application Priority Data

Mar. 30, 1995 [JP] Japan ................................. 7-072828

[51] Int. Cl.⁶ ............................ G05B 15/00; G06F 15/80; G06F 15/16
[52] U.S. Cl. ................... 364/132; 364/133; 395/182.09; 395/183.07; 395/200.38
[58] Field of Search ........................ 395/200.05, 200.07, 395/183.07, 182.09, 200.38, 200.42; 364/132, 133

[56] References Cited

U.S. PATENT DOCUMENTS

| | | | |
|---|---|---|---|
| 4,610,013 | 9/1986 | Long et al. | 395/182.09 |
| 4,700,292 | 10/1987 | Campanini | 395/200.2 |
| 4,882,747 | 11/1989 | Williams | 379/102 |
| 4,982,325 | 1/1991 | Tignor et al. | 395/309 |
| 5,157,780 | 10/1992 | Stewart et al. | 395/183.07 |
| 5,263,034 | 11/1993 | Guenthner et al. | 395/184.01 |
| 5,525,913 | 6/1996 | Brooks et al. | 324/771 |

FOREIGN PATENT DOCUMENTS

| | | |
|---|---|---|
| 57-164346 | 10/1982 | Japan . |
| 1-237734 | 9/1989 | Japan . |

Primary Examiner—Reba I. Elmore
Assistant Examiner—Robert J. Dolan
Attorney, Agent, or Firm—Staas & Halsey

[57] ABSTRACT

In the master control unit, updated information is transferred to a slave control unit and a coherence of information between the master control unit and the slave control unit is periodically checked, thereby eliminating a difference of the internal information of the two units which execute a control, a status monitor, and a maintenance of a computer system in an on-line manner and guaranteeing the coherence. When the master control unit recognizes a difference between the information for a predetermined time or more, the slave control unit is halted and the information of the master control unit is made effective. With respect to an abnormality of the master control unit, the master control unit halts by itself. In this instance, the slave control unit is shifted to the master status and takes over the process.

20 Claims, 28 Drawing Sheets

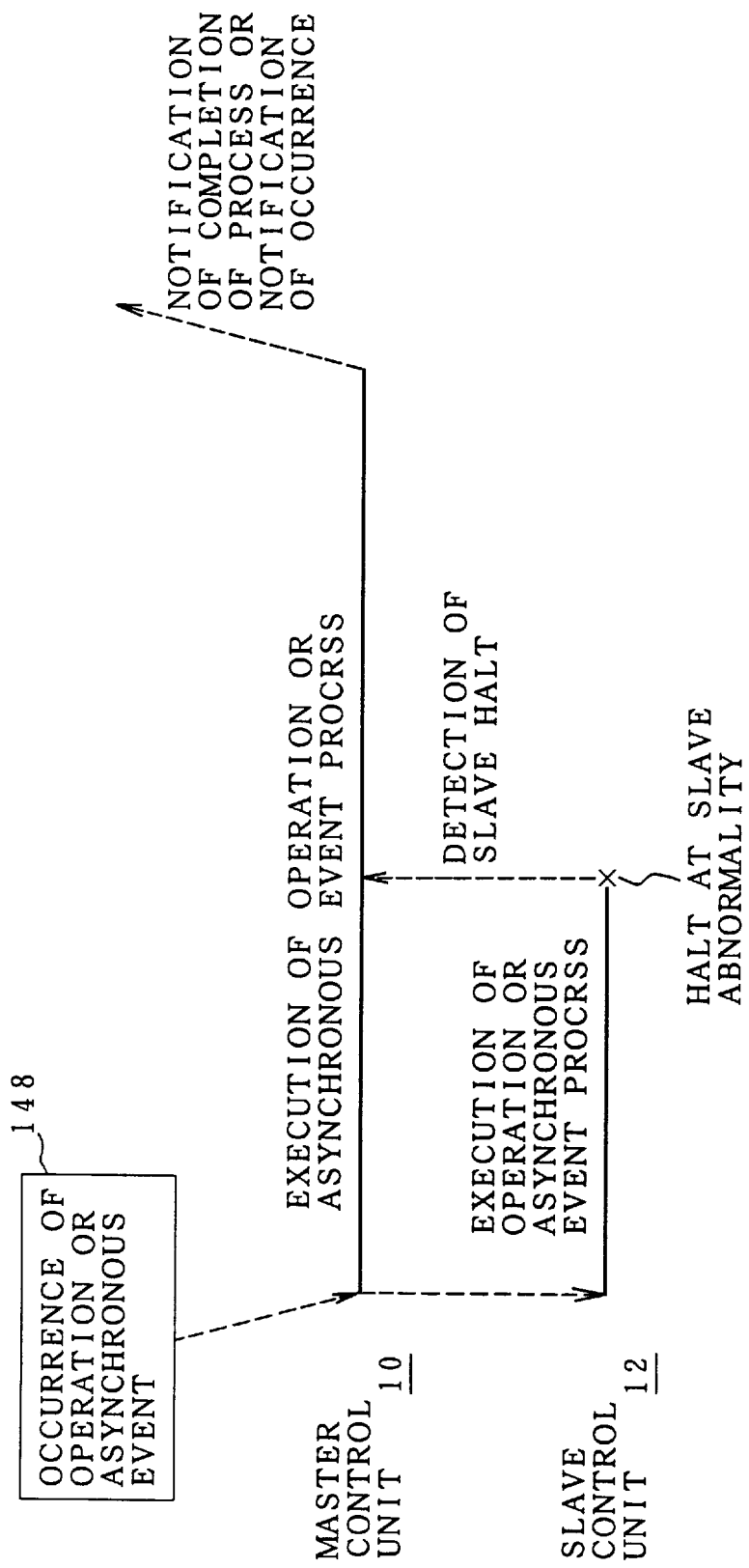

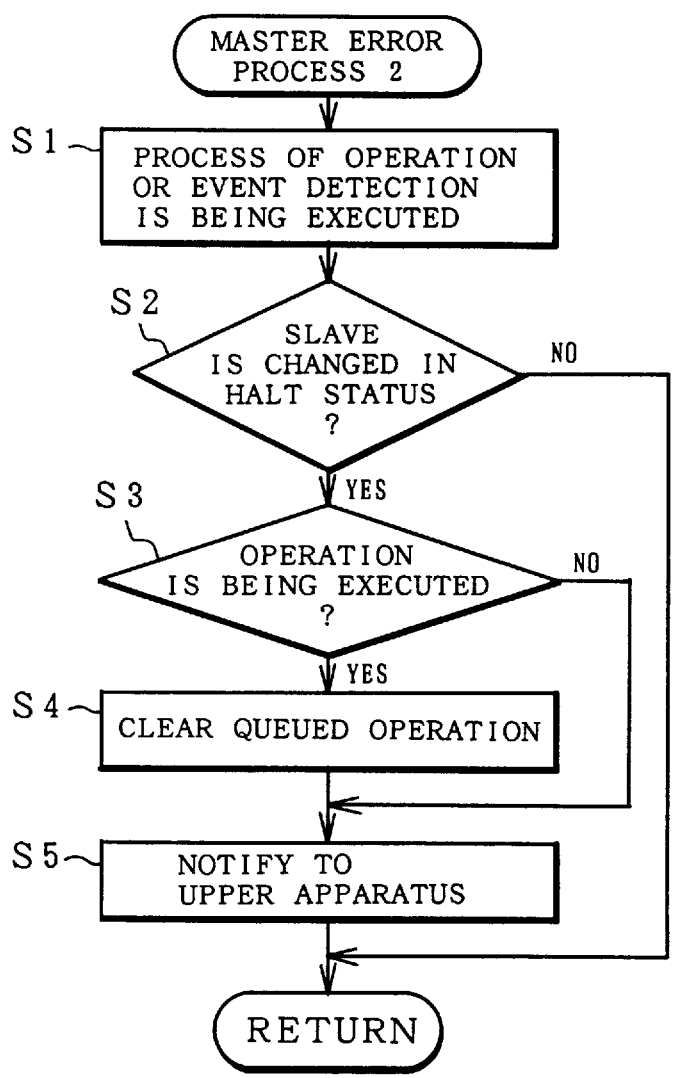

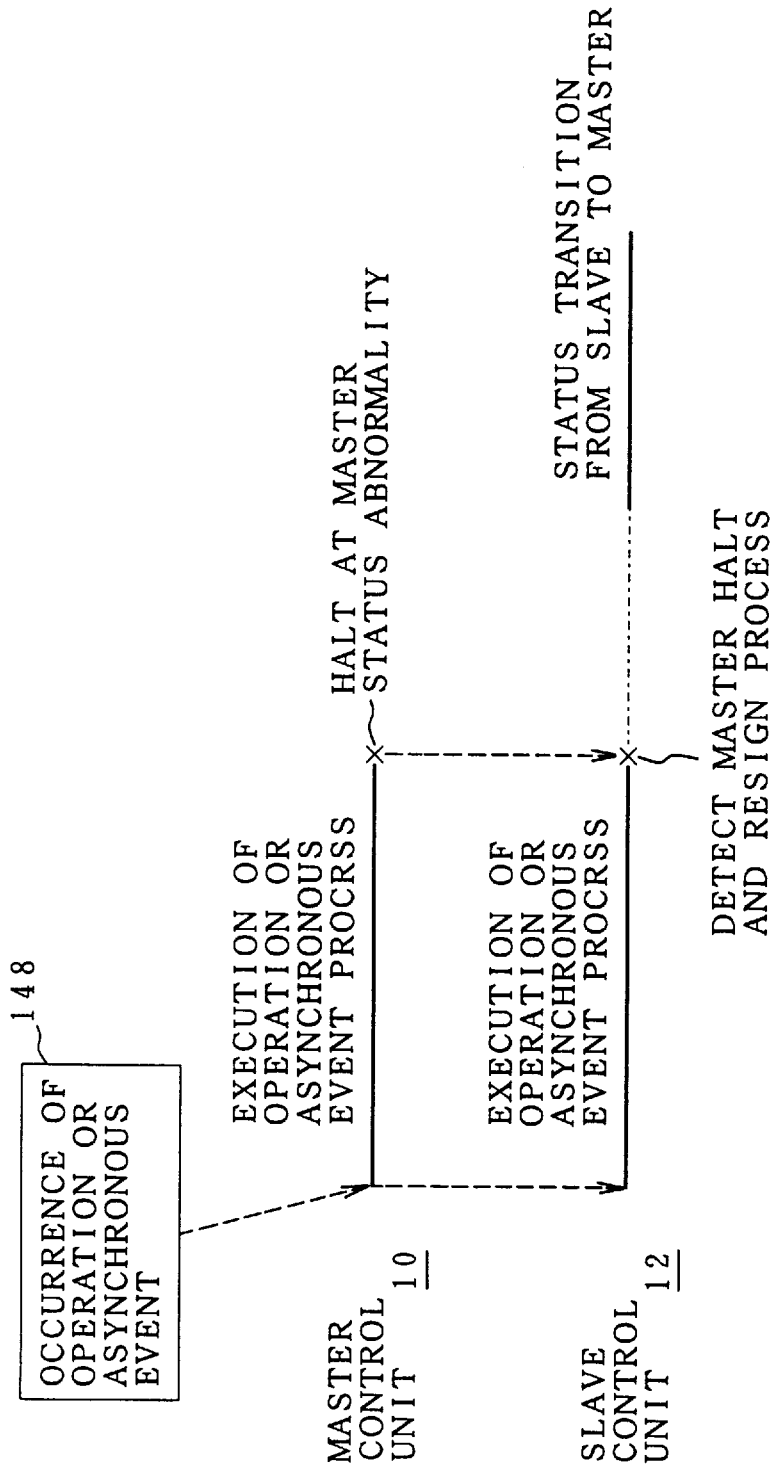

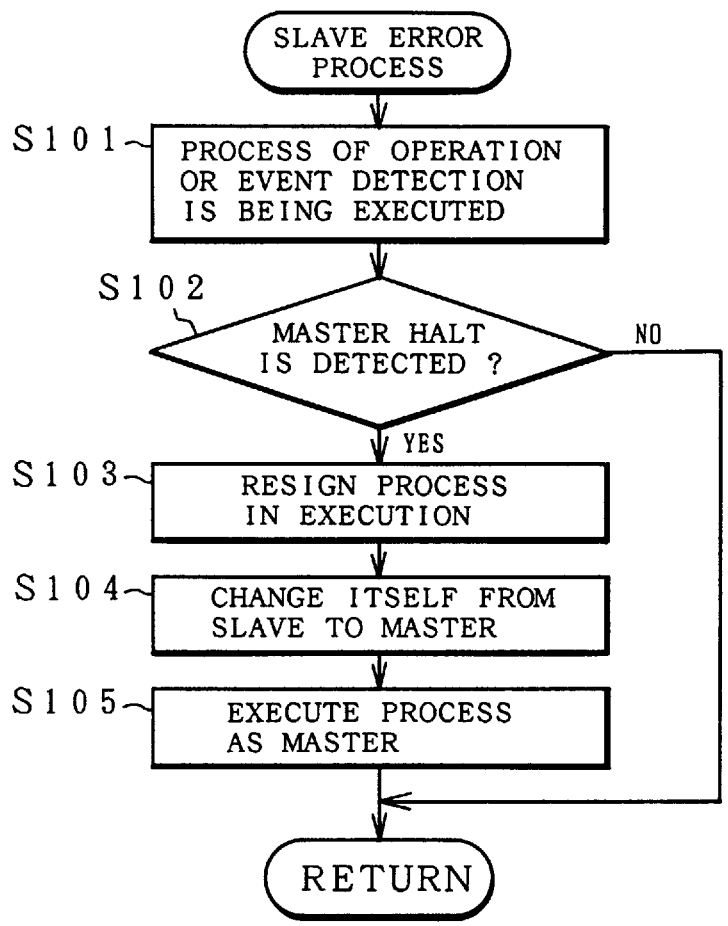

SYSTEM CONTROL APPARATUS INCLUDING A MASTER CONTROL UNIT AND A SLAVE CONTROL UNIT WHICH MAINTAIN COHERENT INFORMATION

BACKGROUND OF THE INVENTION

The invention relates to a system control apparatus for performing control, status monitoring; and maintenance of a computer system of high reliability in an on-line manner. More particularly, the invention relates to a system control apparatus having a double construction in which a system is not stopped by the double construction.

Hitherto, in a large computer system, there is provided a system control apparatus for performing control of a power source of the computer system and activation and stop of component equipment, status monitoring, and further maintenance in an on-line manner. In recent years, the development of a computer system of a high reliability which can avoid a stop of the system by multiplexing computer functions in parallel has progressed. With respect to a system control apparatus which is used for such a high reliable computer system, it is also considered to construct the system control apparatus so as to have a double construction so as not to cause the stop of the computer system by the stop of the system control apparatus.

According to the double construction of the conventional system control apparatus, one system control apparatus is made operative as a daily-use apparatus and the other system control apparatus is set to a standby state as a spare apparatus. If an abnormality occurs in the daily-use apparatus, the apparatus is switched to the spare apparatus and the processes are taken over. In such a system control apparatus with a double construction (using the daily-use apparatus and the spare apparatus is, when an abnormality occurs in the daily-use apparatus, in order to activate the spare apparatus, various information regarding the control, status monitor, and maintenance of the computer system which are possessed by the daily-use apparatus which caused the abnormality has to be taken over as they are. Therefore, after the daily-use apparatus is stopped due to an abnormality, the taking-over of the various kinds of information cannot be guaranteed. Eventually, the computer system is stopped, the spare apparatus is used, and the computer system has to be activated from the beginning. As a method of solving the above problem, there is a method of a double construction in which two system control apparatuses are operated in parallel so as to execute exactly the same processes. In this case, even if one system control apparatus stops, since the other system control apparatus is normally operating, the the computer system is not caused to stop. However, in the two system control apparatuses which simultaneously operate in parallel, when a difference occurs in the information regarding the control, status monitoring, and maintenance of the computer system, it is unknown that the control, status monitoring, maintenance, and the like of the computer system should be executed on the basis of which information. In this case, a method of judging that the computer system has mainly been operated on the basis of the information of which one of the two system control apparatuses and using the information that is considered to be correct is also considered. Since a probability about whether the information is correct or not is fifty—fifty, there is a problem such that the reliability due to the double construction cannot be sufficiently guaranteed.

SUMMARY OF THE INVENTION

According to the invention, there is provided a system control apparatus having a double construction of a high reliability, in which a coherence of information is guaranteed between two apparatuses which are simultaneously operated in parallel. Even when the information differs, it is possible to properly cope with such an event.

According to the invention, two system control units are provided for a computer system. One system control unit becomes a master control unit and executes control, status monitoring, and maintenance of the computer system. Another system control unit becomes a slave control unit and operates in parallel with the master control unit. The slave control unit operates as a standby system while keeping a coherence of information with the master control unit. The master control unit and the slave control unit are connected through a first bus which is used to maintain the coherence of the information. Each of the master control unit and the slave control unit is individually connected to the computer system through an exclusive-use bus. Each of the system control units which operate as a master and a slave has a status transition processing module to decide an operating status of the unit. The status transition processing module has at least each status of initialize, master, slave, and halt. First, when a master installing position is recognized in an initializing status just after the turn-on of the power source, the unit is shifted to the master status. When a slave installing position is recognized in the initializing status just after the turn-on of the power source, after the transition to the master status of the other unit is confirmed, the unit is shifted to the slave status. Further, when the status transition processing module recognizes a self abnormality, the module itself is shifted to the halt status. When an abnormality of the other unit is recognized, the status transition processing module provides a halt to shift the other unit to the halt status. When the other unit which was instructed to halt is the master unit, the status transition processing module itself is shifted to the master status.

An information transmitting/receiving module to guarantee the coherence of the information is further provided for each of the system control units which operate as a master and a slave. When the information transmitting/receiving module is shifted to the slave status by the status transition processing module, the information transmitting/receiving module requests the other unit which has already been shifted to the master status to transfer the information to guarantee the coherence. On the other hand, when shifting to the master status, the information transmitting/receiving module transfers the relevant information in accordance with the transfer request of the information to keep the coherence from the other unit. An updating information transfer module is provided for each unit. After shifting to the master status by the status transition processing module, when the updating of the information to guarantee the coherence is recognized, the updating information is transferred to the other unit which has already been shifted to the slave status. Further, a coherence checking module is provided for each unit. When shifting to the master status by the status transition processing module, the coherence checking module compares the information of the other unit, which has already been shifted to the slave status, with the information within its own unit in predetermined increments of time, thereby periodically checking the coherence. In this instance, when the compared information differs for a predetermined time or more, the halt is instructed to the other unit which has already been shifted to the slave status, thereby halting operation.

Each of the master control unit and slave control unit of the invention has an operation processing module for executing a process corresponding to the requested operation when an operation instruction from the computer system is received. When the computer system generates an operation instruction to the master control unit, the master control unit which received the operation instruction activates a self operation processing module and an operation processing module of the slave control unit. The execution of the self operation process is started and, at the same time, parameter data of the operation instruction is transmitted to the slave control unit, the start of the operation process is instructed, and a dual process is realized. When the computer system generates an operation instruction to the slave control unit, the slave control unit which received the operation instruction activates the self operation processing module and the operation processing module of the master control unit. Subsequently, the parameter data of the operation instruction is transmitted to the master control unit. After completion of the reception of the parameter data, the master control unit starts the self operation process and instructs the slave control unit to start the operation process, thereby realizing a dual process.

The master control unit has a queue to store the operation instruction. When the operation instruction is directly received or received via the slave control unit from the computer system, the operation processing module of the master control unit stores it into the queue. After that, the master control system transfers the parameter data between the operation processing module and the slave control unit. When the operation instruction received had been queued at the head with reference to the queue after the end of the transfer, the operation processing module starts the self operation process and also instructs the slave control unit to start the operation process. In case of executing the operations received by the master control unit and slave control unit, when the execution of the operation is finished, the slave control unit notifies the completion of the operation to the master control unit. When the master control unit finishes the self operation and receives the notification of the completion of the operation from the slave control unit, the master control unit recognizes the completion of the execution of the operations of both units and clears the queue. Further, the completion of the process of the operation is notified to the computer system. When the received operation instruction is stored in the queue, the master control unit judges whether the same operation is being executed by the slave control unit at present or not. When the same operation is being executed, it is judged that the operation was generated twice. The double generation is then notified to the computer system without executing the received operation. When an event to be notified to the computer system occurs on the basis of the status monitor of the power source, apparatus status, or the like, the process for the event occurred is executed by both of the master control unit and the slave control unit. When the process is finished, the slave control unit notifies the occurrence of the event to the master control unit. When the self process is finished and the notification of the occurrence of the event from the slave control unit is received, the master control unit recognizes that the process for the event occurred is finished by both units, and notifies the occurrence of the event to the computer system. When the self operation process is finished, if the notification of the end of the operation process from the slave control unit is not received, the master control unit activates a timer and monitors the time. When the end of the process is not notified from the slave control unit even after the elapse of a predetermined time, it is judged that an abnormality has occurred in the slave control unit, and operation is halted by the halt instruction. The master control unit then regards that the self process is normally finished, and clears the operation stored in the queue. Further, the end of the process is notified to the computer system. With respect to the process for the occurrence of the event, in a manner similar to the above, when the self process is finished, if the notification of the occurrence of the event from the slave control unit is not received, the master control unit activates the timer and monitors the time. When the occurrence of the event of the process is not notified from the slave control unit even after the elapse of a predetermined time, it is judged that an abnormality occurred in the slave control unit, thereby halting operation by the halt instruction. The master control unit regards that the self process is normal, and notifies the occurrence of the event to the computer system. When the self operation process is finished and the notification of the end of the operation process from the slave control unit is received, the master control unit compares the processing information of both units. When they differ, it is judged that an abnormality occurred in the slave control unit, thereby halting operation by the halt instruction. The master control unit regards that the self process is normally finished, and clears the operation stored in the queue. Further, the end of the process is notified to the computer system. With respect to the process of the occurrence of the event as well, in a manner similar to the above, when the self process is finished and the notification of the occurrence of the event from the slave control unit is received, the master control unit compares the notifications of the occurrence of the events of both units. When they differ, it is judged that an abnormality occurred in the slave control unit, thereby halting operation by the halt instruction. The master control unit regards that the self process is normal, and notifies the occurrence of the event to the computer system.

When an abnormality is detected during the transfer of the parameter data from the slave control unit to the master control unit in association with the operation instruction, the slave control unit halts itself and the master control unit resigns the operation stored in the queue, thereby finishing operation. During the execution of the operation process, when the status of the slave control unit which is executing the operation process simultaneously becomes abnormal and it is recognized that the unit was shifted to the halt status, the master control unit regards that the self process is normally finished, thereby clearing the operation stored in the queue. Further, the end of the process is notified to the computer system. During the process of the event occurred, when the status of the slave control unit which is executing the process of the event occurred simultaneously becomes abnormal and it is recognized that the unit was shifted to the halt status, the master control unit regards that the self process is normal, thereby notifying the occurrence of the event to the computer system. Further, during the execution of the process by the slave control unit, when the status of the master control unit becomes abnormal and it is detected that the unit was shifted to the halt status, the process which is at present being executed is resigned and, after that, the self status is shifted from the slave status to the master status.

According to the system control unit having such a double construction of the invention, by the transfer of the updating information to the slave control unit by the master control unit and the periodic discrimination about the coherence between the master and slave control units, the difference between the internal information of the two units which execute the control, status monitoring, and maintenance of the computer system in an on-line manner is eliminated and the coherence can be guaranteed. When the master control unit recognizes the difference of the information for a predetermined time or more, the slave control unit is halted and the information of the master control unit is made effective. With respect to the abnormality of the master control unit, the unit halts by itself. In this instance, the slave control unit recognizes the halt of the master control unit and shifts the status to the master control unit and takes over the process thereto. In this case, since the coherence of the information of both units is guaranteed, the taking-over by the halt of the master control unit never exerts an influence on the outside and doesn't cause the stop of the computer system. In the invention, the master control unit between two system control units is set to a target of the operation process from the computer system. When the computer system generates the operation, the operation is executed by both of the master control unit and the slave control unit. When the execution of the operation is finished, the master control unit synchronizes with the end of the process of the slave control unit and judges the execution result of the operation on the basis of the result of the master processing unit. This point shall also similarly apply to the process of the occurrence of an asynchronous event in the status monitor of the power source, apparatus status, or the like. By executing the operation by the two system control units as mentioned above, the coherence of the internal information of the two system control units can be realized. By setting the master control unit to the target of the operation process by the computer system, even if a difference between the information occurs, the information of the master control unit is made effective and the control, status monitoring, and maintenance of the system are guaranteed.

The above and other objects, features, and advantages of the present invention will become more apparent from the following detailed description with reference to the drawings.

BRIEF DESCRIPTION OF THE DRAWINGS

FIG. 25 is an explanatory diagram of a process in the case where an abnormality occurred during the execution of the process on the slave side;

FIG. 26 is a flowchart for the processing operation of FIG. 25;

FIG. 27 is an explanatory diagram of a process in the case where an abnormality occurred during the execution of the process on the master side; and FIG. 28 is a flowchart for the processing operation of FIG. 27.

DETAILED DESCRIPTION OF THE PREFERRED EMBODIMENT

[Operation environment and unit construction]

Figure 1:
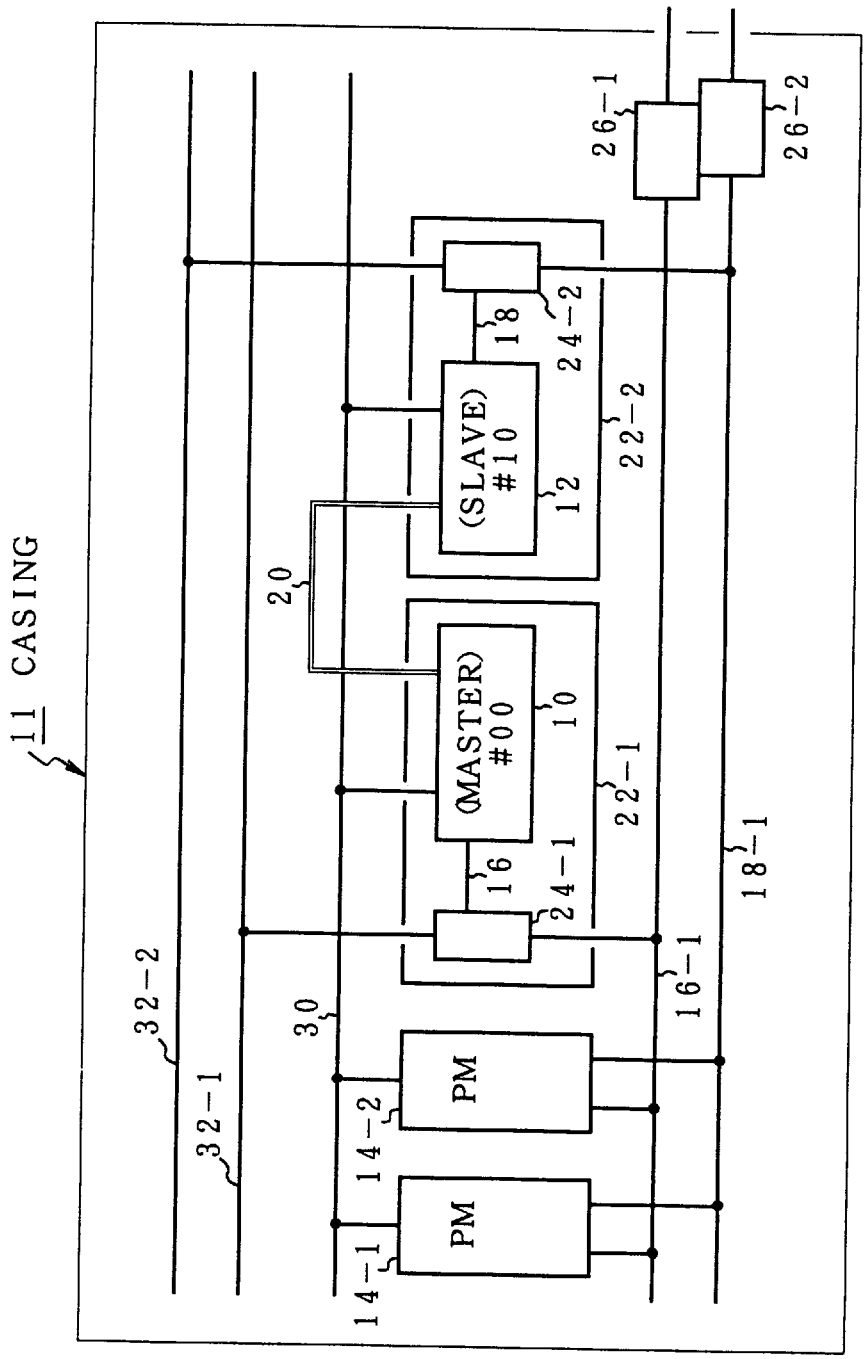
FIG. 1 is a block diagram of a computer system having system control units of the invention.

FIG. 1 is a block diagram of a computer system having a system control unit with a double construction. According to the computer system, processor modules 14-1 and 14-2 are provided in a casing 11. System control modules 22-1 and 22-2 are provided for the processor modules 14-1 and 14-2 constructing the computer system. A system control unit 10 which operates as a master control unit is provided for the system control module 22-1. A system control unit 12 which operates as a slave control unit is provided for the system control module 22-2. The system control unit 10 is connected to a slot number #00 of a bus for operating as a master. The system control unit 12 is connected to a slot number #10 of a bus for operating as a slave. The processor modules 14-1 and 14-2 are connected through two system buses 16-1 and 18-1. System bridge circuits 26-1 and 26-2 are provided for the system buses 16-1 and 18-1 and are connected to system buses of another casing. A plurality of processors are enclosed in each of the processor modules 14-1 and 14-2. Each processor has a cache mechanism. A plurality of processors in the module have one main storage, respectively. A bus 16 of the system control unit 10, provided for the system control module 22-1, is connected to a bridge circuit 24-1. The system control unit 10 is connected to the system bus 16-1 through the bridge circuit 24-1. The system control unit 12 of the system control module 22-2 is also connected to the system bus 18-1 through a bridge circuit 24-2 through a bus 18. Therefore, the system control units 10 and 12 can receive a necessary operation instruction from the processor module 14-1 or 14-2 through the system buses 16-1 and 18-1 and the buses 16 and 18 and can execute a necessary control process. The operation instruction by the processor module 14-1 or 14-2 is fundamentally performed to the system control unit 10 as a master connected to the slot No. #00. If the system control unit 10 on the master side is busy, the operation instruction is generated to the system control unit 12 on the slave side by using the system bus 18-1. The system control units 10 and 12 are connected by an exclusive-use bus 20. The bus 20 is used for information transmission to guarantee a coherence of various kinds of information which is necessary for control, status monitoring, and maintenance of the computer system and which is held in the system control units 10 and 12. Further, a maintenance bus 30 is connected to the system control units 10 and 12. The system control units 10 and 12 can directly receive an instruction regarding the maintenance from an upper unit. Input/output buses 321 and 32-2 are individually connected to the system control units 10 and 12 through the bridge circuits 241 and 24-2, so that input/output processes of the necessary information can be executed between the system control units and external input/output units.

Figure 2:
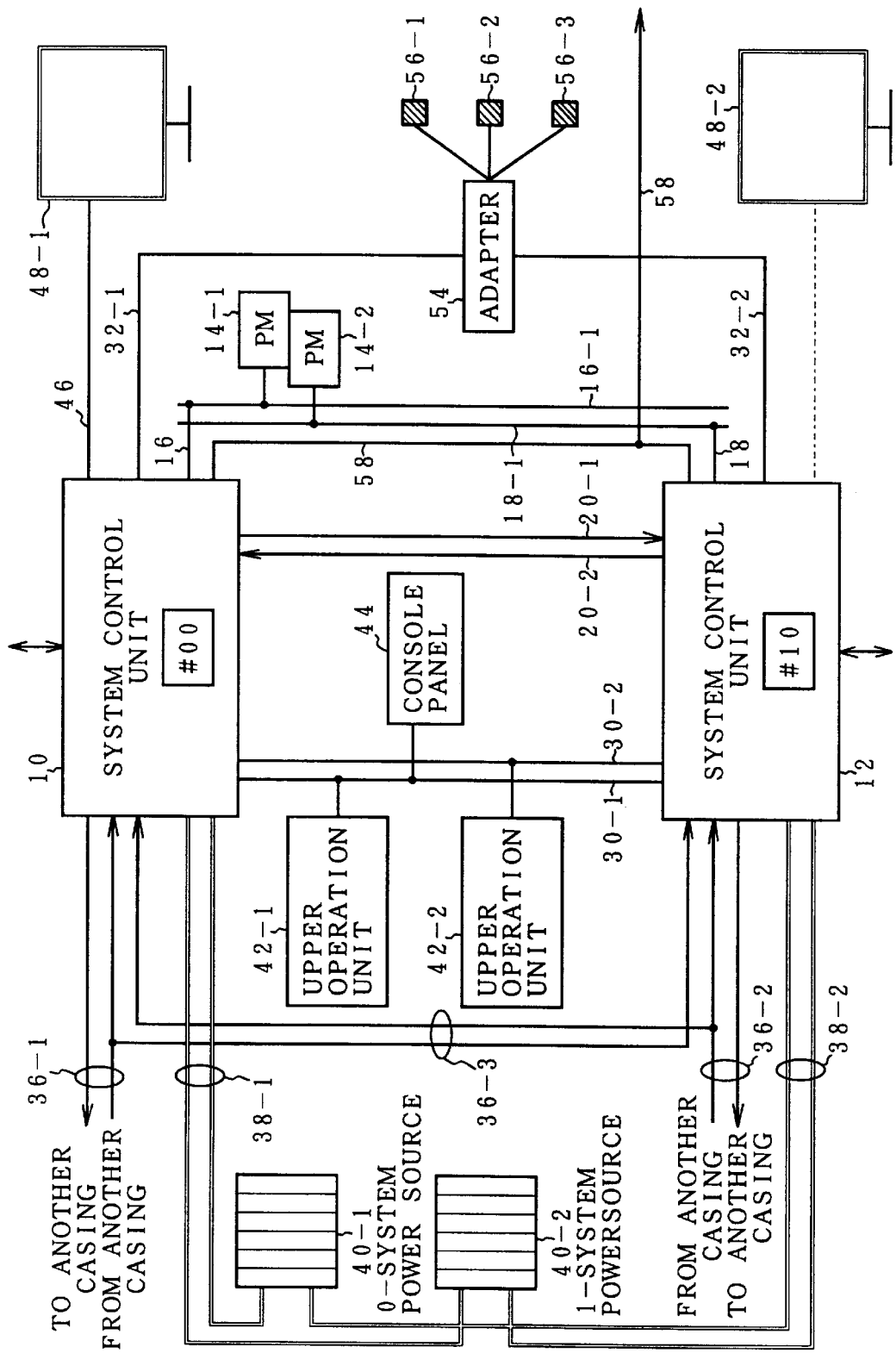
FIG. 2 is a block diagram of a system control module in FIG. 1.

FIG. 2 specifically shows an interface of both of the two system control units 10 and 12 in FIG. 1. First, the system control unit 10 is connected to the processor modules 14-1 and 14-2 as computer systems through the buses 16 and 18 and the system buses 16-1 and 18-1 and executes power-on control, power-off control, and abnormality monitoring in the casing 11 by the operation instructions from the processor modules 14-1 and 14-2. Power source modules 40-1 and 40-2 are connected to the system control units 10 and 12 by power source interface buses 38-1 and 38-2, thereby executing power-on control, power-off control, and abnormality monitor between the casings. The system control unit 10 which operates as a master is connected to a console 48-1 by the device bus 16, so that the system control unit 10 can examine a debug and a fault. Although a console 48-2 is provided for the system control unit 12 side which operates as a slave, the connection by the device bus is not performed. The input/output buses 32-1 and 32-2 connected to the system control units 10 and 12 are connected to external input/output units 56-1 to 56-3 through an adapter 54. By the connection of the input/output buses 32-1 and 32-2, the power source control and monitor of the input/output units 56-1 to 56-3 attached from the outside are executed. Further, the system control units 10 and 12 are connected to an interface bus 58 for an external warning. When the system control units 10 and 12 detect an abnormality in the control, status monitoring, and maintenance, an alarm signal is sent to an external warning unit, thereby executing a warning display operation.

Exclusive-use buses 20-1 and 20-2 are provided between the system control units 10 and 12 in order to transmit and receive information to guarantee a coherence of the internal information. In the embodiment, the bus 20-1 to send information from the system control unit 10 to the system control unit 12 and the bus 20-2 to send information from the system control unit 12 to the system control unit 10 are individually provided. However, a single two-way bus can be also used in place of the buses 20-1 and 20-2. The system control units 10 and 12 are connected to maintenance buses 30-1 and 30-2. An upper operation unit 42-1 and a console panel 44 are connected to the maintenance bus 30-1 side. An upper operation unit 422 is connected to the maintenance bus 30-2 side. A debug function control of the system control units 10 and 12, a panel control, and various processing controls based on the operation instructions from the upper operation units 42-1 and 42-2 are executed by the maintenance buses 30-1 and 30-2. Further, inter-casing interface buses 36-1, 36-2, and 36-3 for connecting with other casings are provided for the system control units 10 and 12. The system control units 10 and 12 can execute a power-on control, a power-off control, and an abnormality monitor between the casings by the inter-casing interface buses 36-1 to 36-3.

By controlling various interfaces for the system control units 10 and 12 in FIG. 2, for example, the following seven functions can be realized.

I. Functions of a power-on, a power-off, and an abnormality monitor in the casing II. Functions of a power-on control, a power-off control, and an abnormality monitor between the casings III. Debug function and a fault checking function IV. Maintenance supporting function V. External system control function for an operator call VI. Power control function from a host for a maintenance or the like VII. Control function of timer for performing a power source calendar of a power-on time, a power-off time, and the like As functions of the system control units 10 and 12, other control functions such as a proper control, status monitoring, a maintenance, and the like can be also provided as necessary.

[Functions of system control unit]

Figure 3:
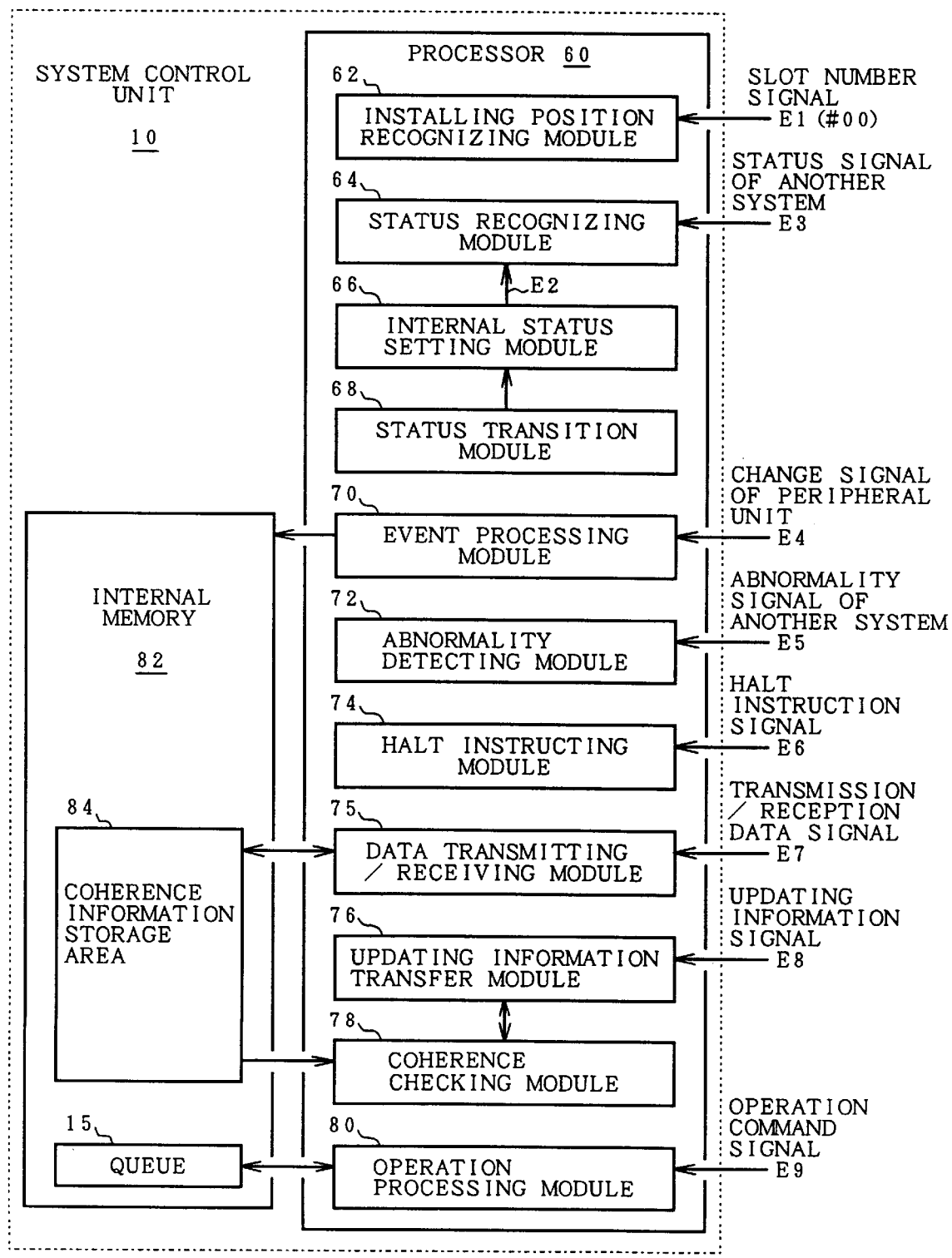
FIG. 3 is a functional block diagram of a master side system control unit in FIG. 2.

FIG. 3 shows functions which are necessary to guarantee a coherence of the internal information between the system control unit 10 and the other system control unit 12 with respect to the system control unit 10 side in FIG. 2 as an example. A processor 60 and an internal memory 82 are provided for the system control unit 10. An installing position recognizing module 62 is provided for the processor 60. When the system control unit 10 is installed into the casing 11 as shown in FIG. 2, the installing position recognizing module 62 fetches a slot number signal E1 of the bus which is determined by the installing position and recognizes a slot No. #00. In the embodiment, the slot No. #00 indicates the installing position as a master control unit. The slot number signal E1 recognized by the installing position recognizing module 62 is given to a status recognizing module 64. An internal status setting module 66 and a status transition module 68 are provided for the status recognizing module 64. As shown in a status transition diagram of FIG. 4, the status transition module 68 has five statuses of initialize 200, master 210, slave 220, state control 230, and halt 240. An event processing module 70 is provided for the processor 60 in FIG. 3 and fetches a change signal E4 of an event in a peripheral unit which is in a monitoring status and updates a status signal of the internal memory 82.

An abnormality detecting module 72 is also provided. When an abnormality signal E5 of another system from the system control unit 12 is recognized, the abnormality detecting module 72 activates a halt instructing module 74 and generates a halt instruction signal E6 to the system control unit 12 side. When an abnormality of the system control unit 10 itself is detected, the abnormality detecting module 72 shifts the processor 60 itself to a halt, namely, the halt 240 in FIG. 4. A data transmitting/receiving module 75 is provided for the processor 60 and transmits and receives various transmission/reception data E7 which is necessary to keep a coherence of the internal information between the system control unit 10 and the other system control unit 12. Various information to keep a coherence obtained by the data transmitting/receiving module 75 is stored into a coherence information storage area 84 allocated into the internal memory 82. Further, an updating information transfer module 76 and a coherence checking module 78 are provided for the processor 60. When the stored information is updated in the coherence information storage area 84 in the internal memory 82 by various processes such as status detection, control, maintenance, etc., the coherence checking module 78 recognizes the information updating and sends an updating information signal E8 to the system control unit 12 by the updating information transfer module 76. The sent data is stored into the coherence information storage area 84 of the system control unit 12. The coherence checking module 78 further checks a coherence of the stored information between the system control unit 10 as a master and the system control unit 12 as a slave at predetermined periods. The coherence check is performed by comparing whether the information in the coherence information storage area 84 which was transferred by the system control unit 12 on the slave side coincides with the self information corresponding to each information or not by using the updating information transfer module 76. If there is different information, the halt instructing module 74 sends the halt instruction signal E6 to the system control unit 12 on the slave side, thereby halting operation. Further, an operation processing module 80 is provided for the processor 60 and receives an operation command signal E9 generated by the processor modules 14-1 and 14-2 constructing the computer system in FIG. 1 and executes the process of the received operation. In correspondence to the operation processing module 80, a queue 15 is provided for the internal memory 82. Operation commands can be continuously received until the queue 15 is filled with the commands. When a plurality of operation commands are received in the queue 15, the operation processing module 80 fetches the first operation command that is oldest, with respect to time, and executes the process.

[Setting and control of master and slave]

Figure 4:
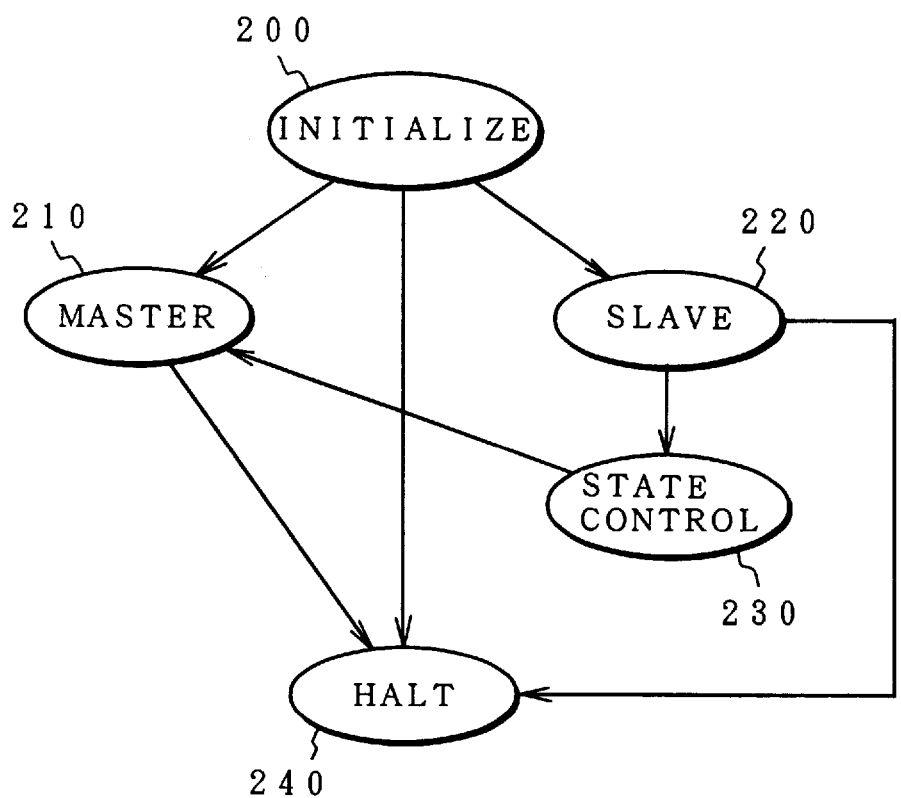
FIG. 4 is a status transition diagram of the system control units of the invention.
Figure 5:
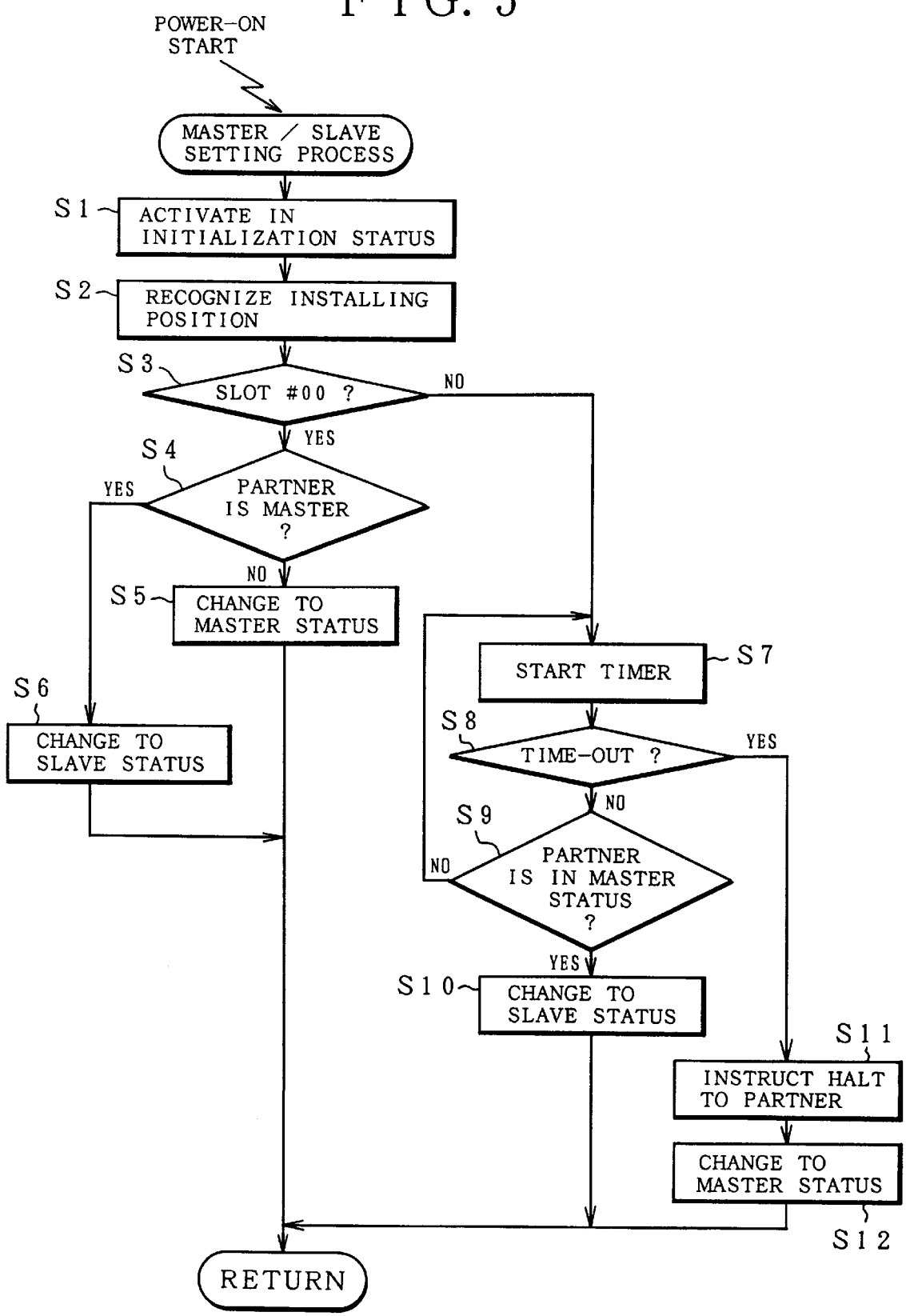
FIG. 5 is a flowchart of a status transition of each of a master and a slave at the time of a power-on start.

FIG. 5 shows a master/slave setting process for performing a status transition to the master 210 or slave 220 in FIG. 4 at the time of the power-on start by the turn-on of the power sources of the system control units 10 and 12. Processes of the system control unit 10 as a master will now be described. When the system control unit 10 is activated by the power-on, first in step S1, the unit is shifted to the status of initialize 200 in FIG. 4. In the status of initialize 200, the installing position recognizing module 60 provided for the processor 60 in FIG. 3 recognizes the slot No. #00 from the slot number signal E1. In step S4, the status of the partner is checked. When the partner is not the master, this means that the system control unit 10 has been installed at the position of the slot No. #00. Therefore, the processing routine advances to step S5 and the unit is shifted to the status of master 210. When the partner is the master, step S6 follows and the unit is shifted to the slave status. Since the slot No. #01 is recognized in the system control unit 12 as a slave side, the processing routine advances from step S3 to step S7 and the timer is started.

The timer monitors a time when the system control unit 10 side is normally shifted to the master status. In step S8, a check is made to see if the timer has timed out or not. Until the timer times out, in step S9, the system control unit 10 on the partner side checks whether it has been shifted to the master status or not. If the system control unit 10 side is shifted to the master status as shown in step S5 within a set time by the timer, step S10 follows and the system control unit 12 side is shifted to the status of slave 220 in FIG. 4. In step S8, when the system control unit 10 side is not shifted to the master status even after the elapse of a predetermined time, this means that an abnormality has occurred on the system control unit 10 side. Therefore, a halt is instructed to the partner side in step S11. The system control unit 12 is shifted to the master status in step S12. On the other hand, after the system control unit 10 has shifted to the master status or the system control unit 12 has shifted to the slave status, for example, when the system control unit 10 is removed for maintenance and inspection, the system control unit 12 recognizes it and the removal shifted to the master status 210 via a preparation stage of the state control 230 in FIG. 4. After that, when the repair of the system control unit 10 is finished and the unit 10 is activated and inserted to the slot No. #00, the unit is shifted to the status of initialize 200 and is then shifted to the status of slave 220.

Figure 6:
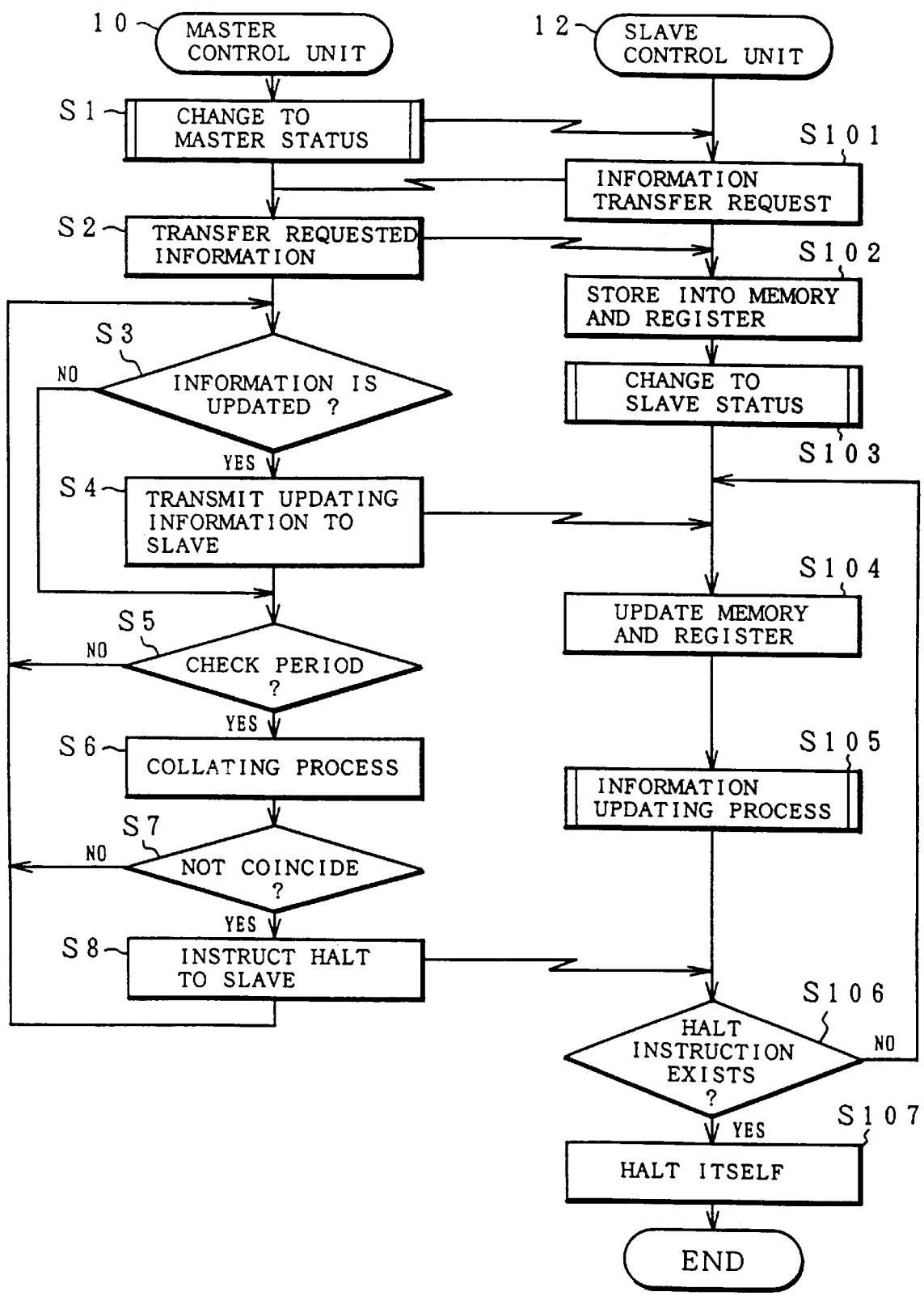
FIG. 6 is a flowchart for a checking process of a coherence after shifting to a master status and a slave status.

A flowchart of FIG. 6 shows a status transition in association with a check of an information coherence in an operating status after the system control unit 10 was shifted to the master status or the system control unit 12 was shifted to the slave status by the setting of master/slave in association with the power-on start of FIG. 5.

In FIG. 6, the left side shows the processes of the system control unit 10 which operates as a master unit and the right side shows the processes of the system control unit 12 which operates as a slave unit corresponding to the master unit. In the following description, the system control unit serving as a master side is referred to as a master control unit 10 and the system control unit serving as a slave side is referred to as a slave control unit 12.

When the master control unit 10 is shifted to the master status in step S1, the transition to the master status is notified to the slave control unit 12. In response to the notification, the slave control unit 12 generates a transfer request of information which is necessary to keep a coherence, in order to realize a double construction to the master control unit 10, in step S101. In response to the information transfer request, in step S2, the master control unit 10 transfers the requested status to the slave control unit 12. In step S102, the slave control unit 12 stores the information transferred from the master control unit 10 into a memory or a register. By this process, coherence between the information at the initial stage in the master control unit 10 and slave control unit 12 is established. Subsequently, the slave control unit 12 is shifted to the slave status in step S103. In an ordinary operating status after the master control unit 10 is shifted to the master status in step S1 or the slave control unit 12 is shifted to the slave status in step S103, the master control unit 10 checks whether the information to guarantee a coherence has been updated or not in step S3. If the information has been updated, each system control unit transmits the updating information to the partner side, thereby allowing the system control unit on the partner side to store the updating information transmitted to the memory or register. Thus, coherence of the updating information in the master control unit 10 and slave control unit 12 is guaranteed. The information updating process in the slave control unit 12 is executed in step S105 and the processing contents on the slave side are substantially the same as the processes in steps S3 and S4 on the master side. The processes on the master side which correspond to the slave side are also substantially the same as the process in step S104 on the slave side. In step S5, the master control unit 10 checks whether a predetermined check period for coherence has been reached or not. In step S6, the master control unit 10 executes a collating process for judging whether the information sent from the slave control unit 12 coincides with the information of the master control unit itself or not. In the collating process, when it is judged that they are different in step S7, a halt is instructed to the slave control unit 12 in step S8. In response to the halt instruction, when the slave control unit 12 discriminates the halt instruction in step S106, the slave control unit halts by itself in step S107 and stops the process.

Figure 7:
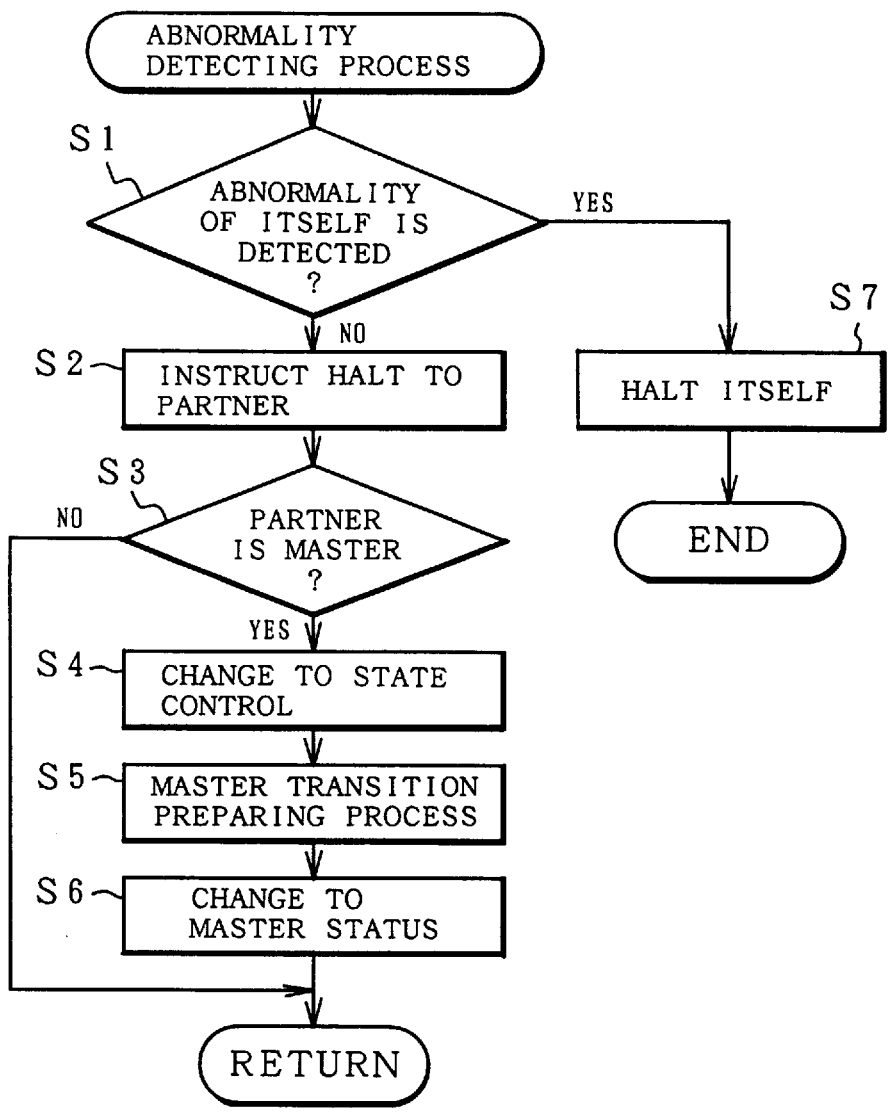
FIG. 7 is a flowchart for a status transition of an abnormality detecting process.

A flowchart of FIG. 7 relates to processes in the case where the system control units 10 and 12 detect an abnormality. When an abnormality is detected, first in step S1, a check is made to see if the abnormality has occurred in the unit itself or not. If YES, the unit halts by itself in step S7 and stops the processes. When the abnormality in the partner side is detected in step S1, a halt is instructed to the partner side in step S2. In step S3, a check is made to see if the partner which instructed the halt is the master or not. If YES, the unit is shifted to the state control 230 in FIG. 4 in step S4. A preparing process to set the unit to the master is executed in step S5. After that, the unit is shifted to the master status in step S6.

[Execution of the operation]

Figure 8:
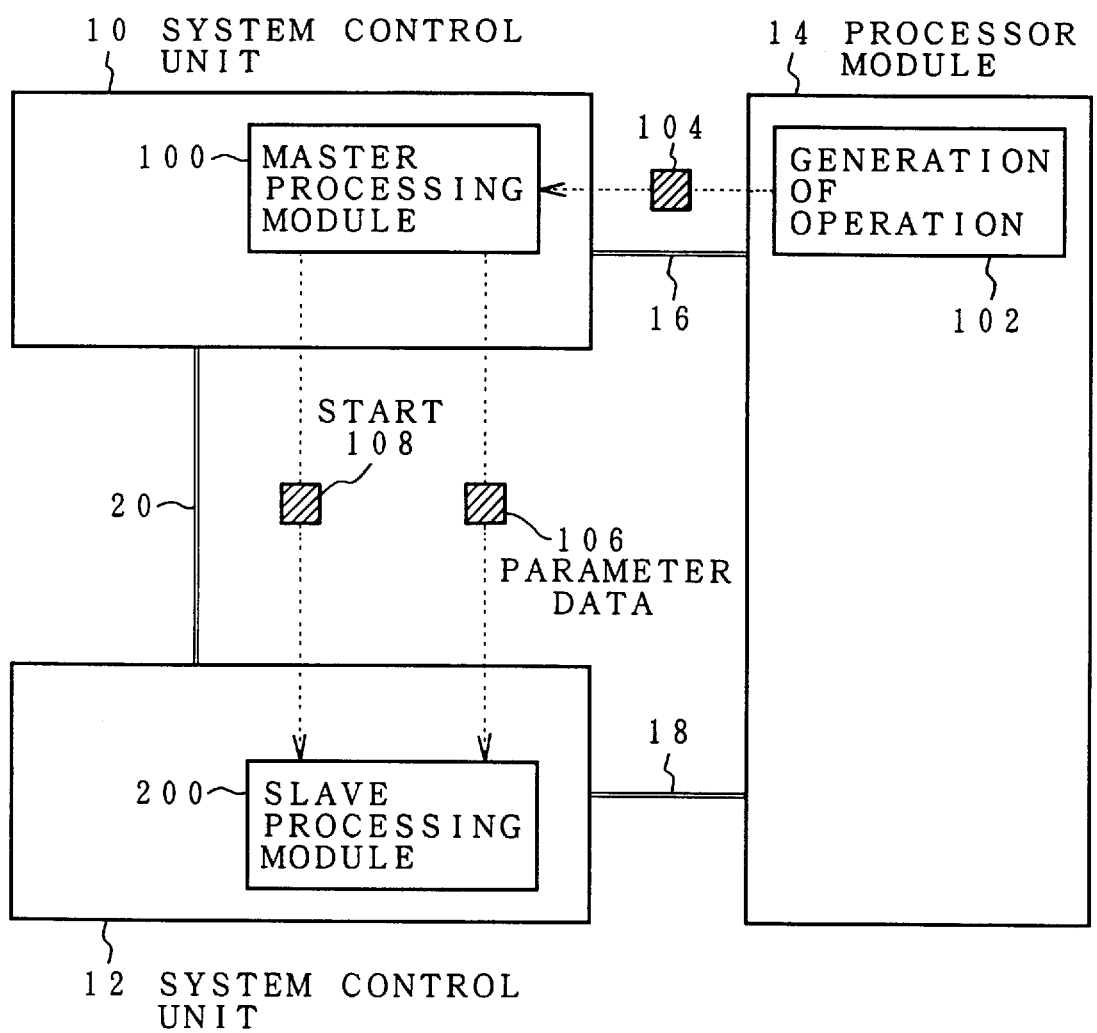
FIG. 8 is an explanatory diagram of a processing operation in the case where an operation is generated to the master side.

FIG. 8 shows a processing operation when the operation is generated from a processor module 14 as a computer system to the system control unit 10 which is in the master status. The system control units 10 and 12 are individually connected to the processor module 14 through the buses 16 and 18. The system control units 10 and 12 are mutually connected by the exclusive-use bus 20. The system control unit 10 realizes a function as a master processing module 100 by the transition to the master status. Further, the system control unit 12 realizes the function as a slave processing module 200 by the transition to the slave status. In this status, it is now assumed that an operation 102 was generated from the processor module 14 to the system control unit 10 through the bus 16. The generation of the operation 102 is realized by sending an operation command 104 to be transmitted to the system control unit 10 as a destination by using the bus 16. The operation command 104 has at least parameter data that is necessary as a command. When the operation command 104 is received, the system control unit 10 executes an activation interruption to the master processing module 100 of the system control unit 10 itself and the slave processing module 200 of the system control unit 12, thereby making those modules operative. The master processing module 100 which was made operative by receiving the activation interruption receives the operation command 104 from the processor module 14. After that, the master processing module 100 transmits parameter data 106 to the slave processing module 200 of the system control unit 12 through the bus 20. After completion of the transmission of the parameter data 106, the master processing module 100 starts to execute the operation of itself and, at the same time, transmits an interruption command 108 to start the operation process to the slave processing module 200 of the system control unit 12. By receiving the processing start interruption command 108, the slave processing unit 200 executes the process of the same operation which was transferred before the command 108. Even when the operation 102 is generated from the processor module 14 to the system control unit 10, the same operation process is executed in both of the two system control units 10 and 12.

Figure 9:
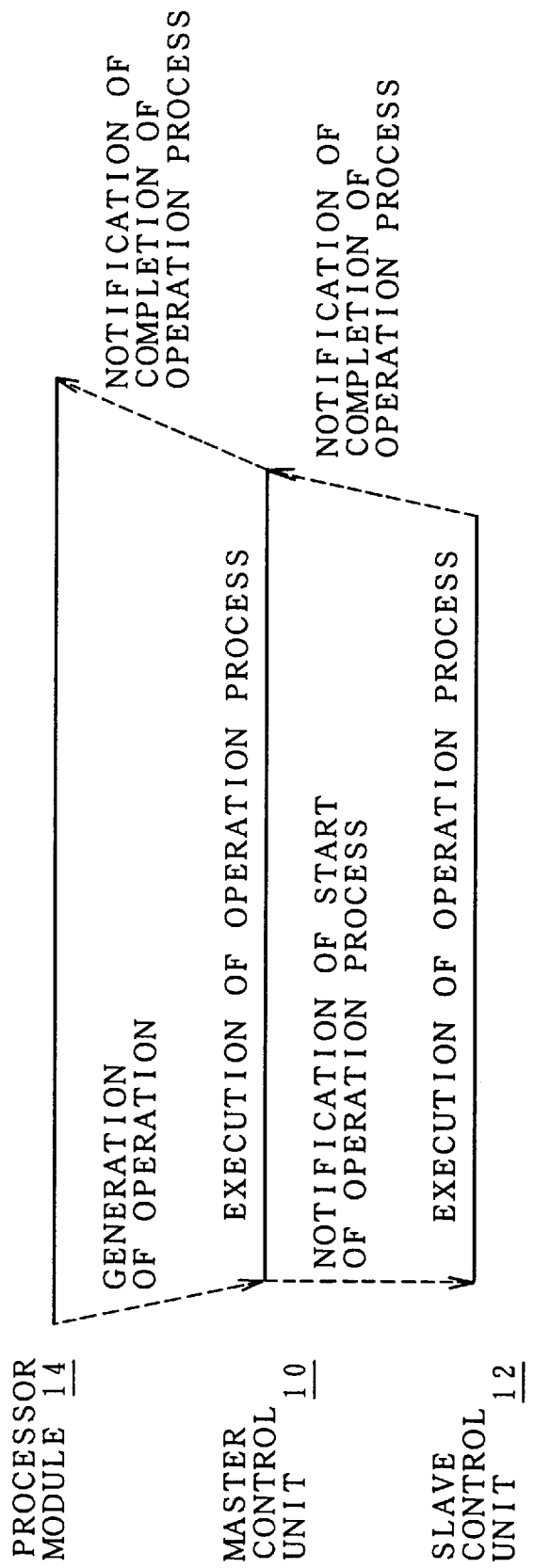
FIG. 9 is a sequence explanatory diagram of the processing operation in FIG. 8.

FIG. 9 is a sequence of the processes in FIG. 8. The generation of the operation from the processor module 14 is transferred to the slave system control unit 12 via the master system control unit 10 and both operation processes are executed in parallel. When the execution of the self operation process is finished, the master system control unit 10 waits for a notification of the end of the execution of the operation process on the slave system control unit 12 side. When the end notification is received from the slave system control unit 12, it is judged that the operation processes have normally been finished in both of the units 10 and 12. An operation process end notification is sent to the processor module 14 as an operation generating source. Thus, a series of processes from the generation of the operation to the end of the operation are executed.

Figure 10:
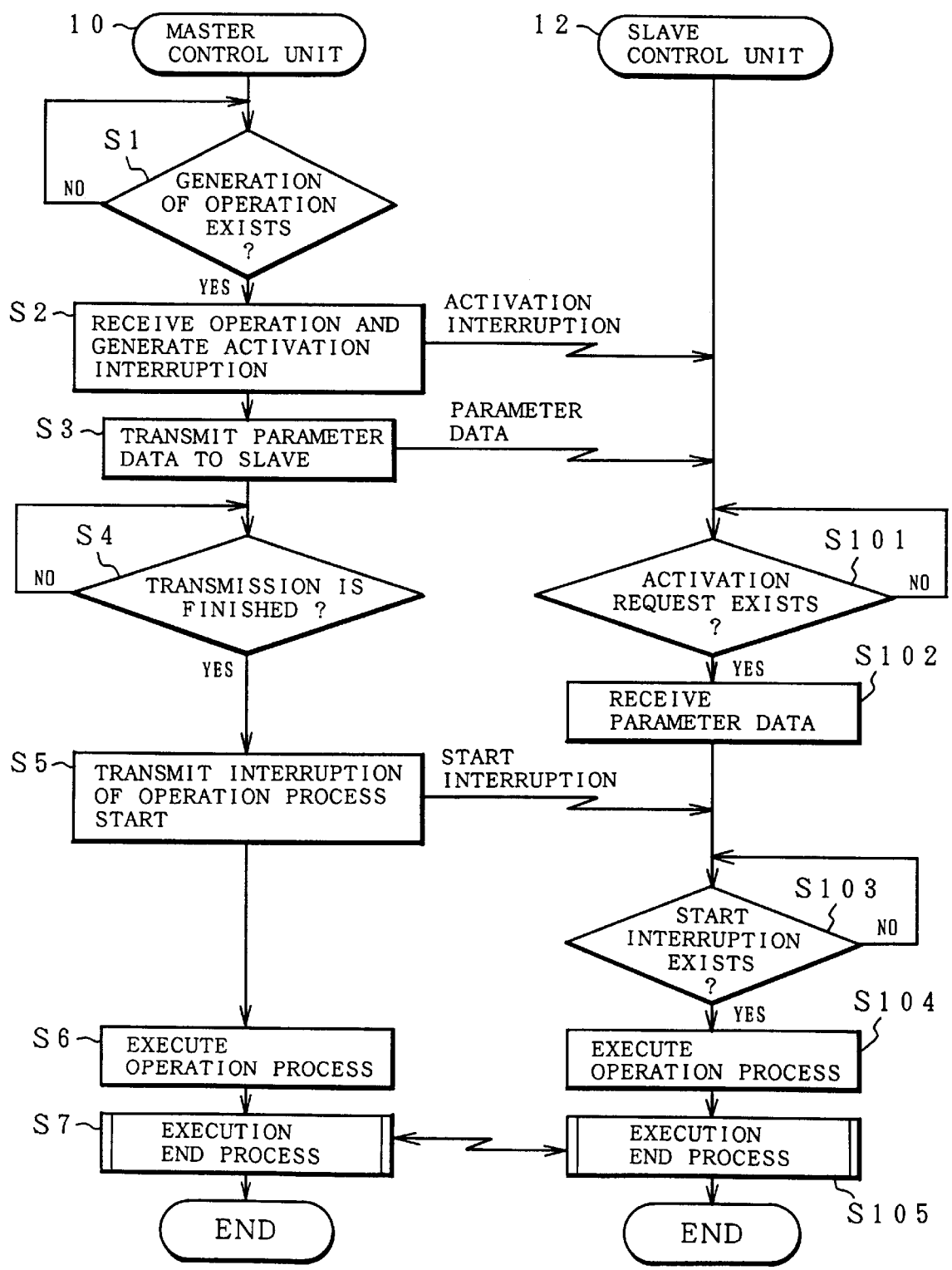
FIG. 10 is a flowchart for the processing operation of FIG. 8.

FIG. 10 shows the processing operation of FIG. 8 by flowcharts for the master control unit 10 and slave control unit 12. First in step S1 of the master control unit 10, when the generation of the operation is recognized, in step S2, the operation is received and, at the same time, an activation interruption to the master control unit itself and an activation interruption to the slave control unit 12 are generated. In step S3, parameter data is transmitted to the slave control unit 12. When the activation request is recognized in step S101, the slave control unit 12 activates the process. In step S102, the parameter data is received. When the end of the transmission of the parameter data is judged in step S4 of the master control unit 10, the start of the operation process is interruption transmitted to the slave control unit 12 in step S5. In this instance, since the process of the master control unit itself is also started, the operation process is executed in step S6. When the slave control unit 12 judges the start of an interruption from the master control unit 10 in step S103, the operation process is executed in step S104. As mentioned above, the same operation process is executed in parallel in the master control unit 10 and slave control unit 12. When the operation process is finished, the master control unit 10 executes an execution end process in step S7 and the slave control unit 12 executes an execution end process in step S105. As for contents in the execution end processes S7 and S105, as shown in a time chart of FIG. 9, in the master control unit 10, the unit 10 waits for the end notification from the slave control unit 12 by the end of the self process and, when the end notification is received, the end of process is notified to the processor module 14. An error process in the case where the processes are not normally finished in the master control unit 10 or slave control unit 12 will be clearly described hereinlater.

Figure 11:
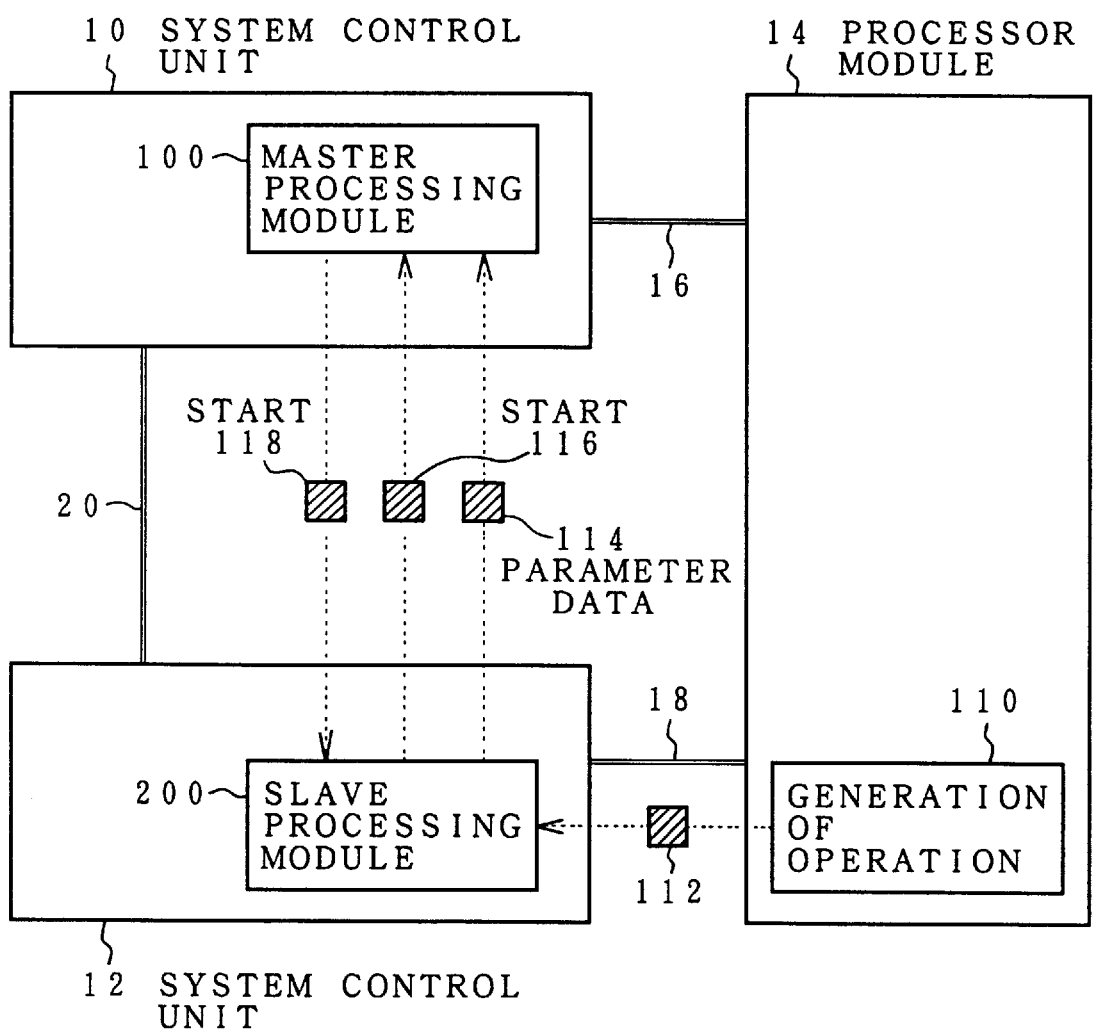
FIG. 11 is an explanatory diagram of a processing operation in the case where an operation is generated to the slave side.

FIG. 11 shows processes in the case where the operation was generated from the processor module 14 to the system control unit 12 on the slave side. When the generation of the operation from the processor module 14 to the system control unit 10 by using the bus 16 enters a busy status, the processor module 14 executes an operation generation 110 to the system control unit 12 (serving as a slave side) by using the bus 18 which is in a vacant state. In association with the operation generation 110, an operation command 112 is sent to the system control unit 12 via the bus 18. An activation interruption of the system control unit 12 itself and an activation interruption for the system control unit 10 are generated. The slave processing module 200 and master processing module 100 are made operative. Subsequently, the slave processing module 200 sends parameter data 114 included in the received operation command 112 to the master processing module 100 of the system control unit 10. After completion of the transmission of the parameter data 114, the slave processing module 200 generates an interruption command 116 to start the operation process to the master processing module 100. In response to the start interruption command 116, the master processing module 100 executes the process based on the parameter data 114 which has already been received and, at the same time, generates a start interruption command 118 of the operation process to the slave processing module 200. In response to the start interruption command 118 from the master processing module 100, the slave processing module 200 executes the operation process which has already been received. Although the operation from the processor module 14 has been generated to the system control unit 12 on the slave side as mentioned above, the operation is started from the system control unit 10 side on the master side.

Figure 12:
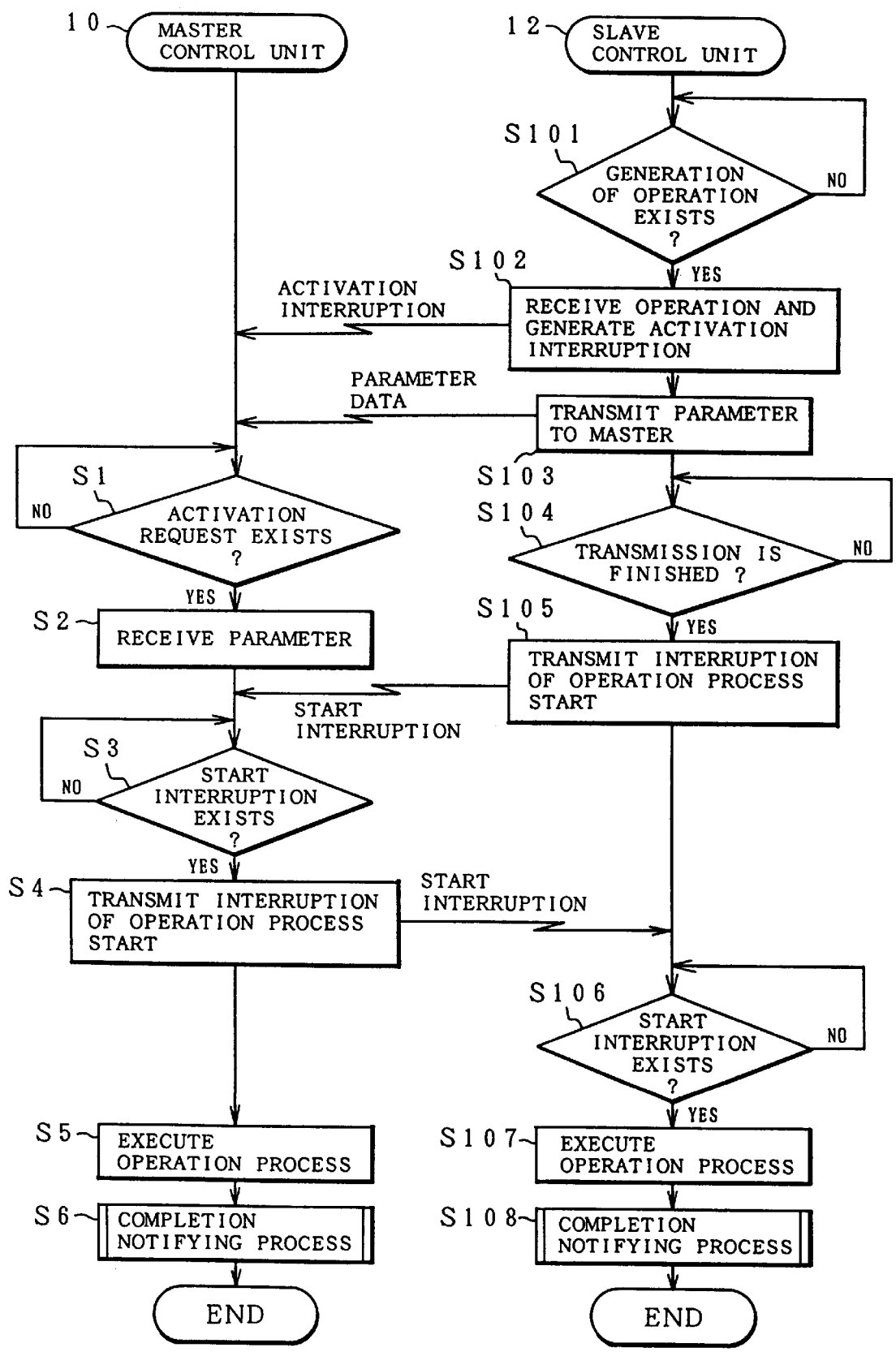
FIG. 12 is a flowchart for the processing operation in FIG. 11.

FIG. 12 is a flowchart for a processing operation of FIG. 11. Processes of the master control unit 10 and slave control unit 12 are arranged. First in step S101 of the slave control unit 12, when the generation of the operation is recognized, the reception of the operation and an activation interruption based on it are generated in step S102. In step S103, parameter data is transmitted to the master control unit 10. When the master control unit 10 recognizes an activation request by the activation interruption in step S1, the parameter data is received in step S2. When the end of the transmission of the parameter data is judged in step S104, the slave control unit 12 transmits an interruption command to start the operation process to the master control unit 10 in step S105. The master control unit 10 recognizes the interruption command to start the process in step S3 and starts the self operation process in step S4 and, at the same time, transmits the process start interruption command to the slave control unit 12. When the process start interruption command from the master control unit 10 is recognized in step S106, the slave control unit 12 executes the operation process in step S107. In this instance, on the master control unit 10 side, the operation process has already been executed in step S5. Completion notifying processes in steps S6 and S108 after the execution of the operation process is finished are substantially the same as those in the case where the operation is generated to the master side unit 10 in FIG. 10. After waiting for the process end notification from the slave control unit 12, the master control unit 10 notifies the processor module 14 that the process has ended.

[Execution of operation accompanied with queueing]

Figure 13:
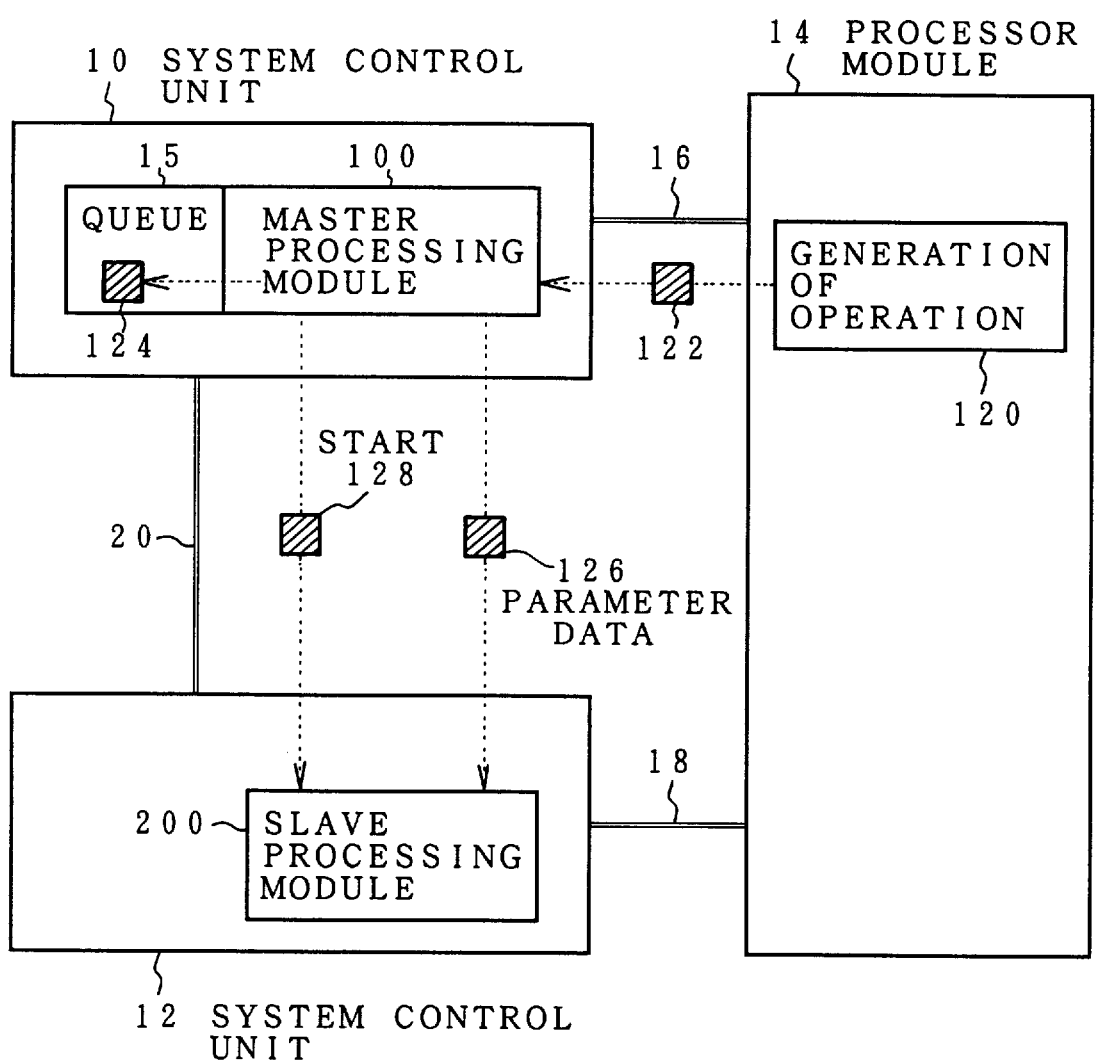
FIG. 13 is an explanatory diagram of a processing operation in case of queueing the operation generated to the master side.

FIG. 13 shows processes in the case where the queue 15 is provided for the system control unit 10 (which operates as a master). The operation command received by the generation of the operation from the processor module 14 is received by the queue 15 and, after that, the operation process is executed. The case where the operation was generated from the processor module 14 to the system control unit 10 on the master side will now be described as an example. In this case, by the reception of an operation command 122 in association with a generation of operation process 120, an activation interruption is performed within the system control unit 10 and system control unit 12. The received operation command 122 is stored in the queue 15. The queue 15 has an index to determine the order of the processes in accordance with the receiving order with respect to time. Subsequently, the master processing module 100 transmits parameter data 126 obtained from the received operation command 122 to the slave processing module 200 of the system control unit 12. When the transmission of the parameter data 126 is finished, the master processing module 100 refers to the queue 15. In the case where a received operation 124 has been first queued, the operation received before had already been finished and the present operation process is not executed. Therefore, the master processing module 100 allows itself to start the process of the operation 124. At the same time, an interruption command 128 to start the operation process is sent to the slave processing module 200, thereby starting the process.

Figure 14:
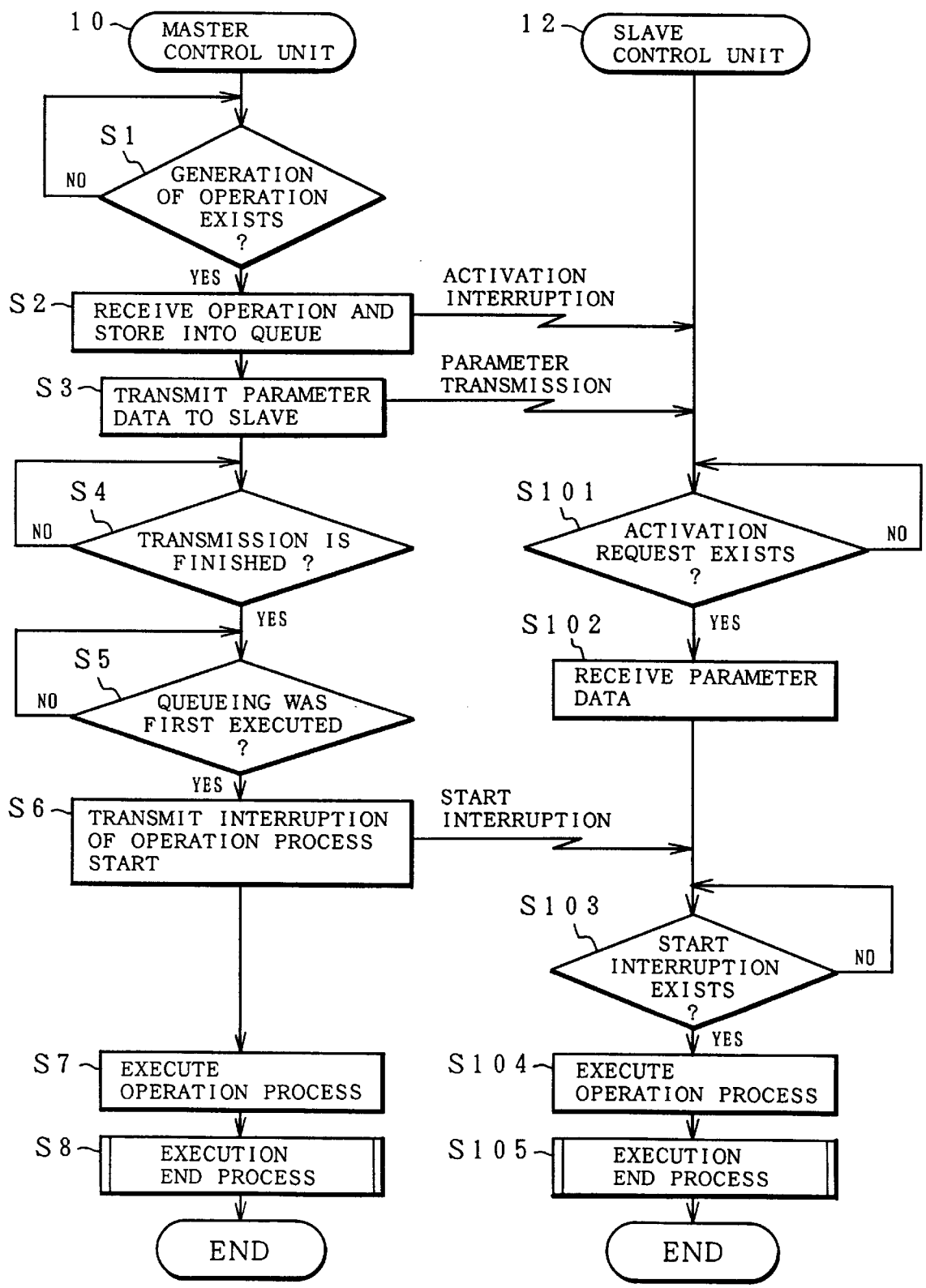
FIG. 14 is a flowchart for the processing operation of FIG. 13.

FIG. 14 is a flowchart for execution of the operation process accompanied with the queueing of FIG. 13. The process is substantially the same as that in the case where the queueing in FIG. 10 is not executed, except that the queue 15 is stored when the generated operation is received in step S2 on the master control unit 10 side, and that after the parameter data is transmitted, a check is made to see if the queueing has been first performed or not by referring to the queue 15 in step S5. The operation process is then started in step S6 in accordance with the check result. Further, with respect to execution end processes in steps S8 and S105, after completion of the process of the master processing module 100 itself, when the master processing module 100 of the system control unit 10 receives the process end notification from the slave processing module 200 of the system control unit 12, the operation 124 (in which the process of the queue 15 is finished) is. This relates to a process that is peculiar to the queueing. The other processes are substantially the same as those in the case where queueing is not performed.

Figure 15:
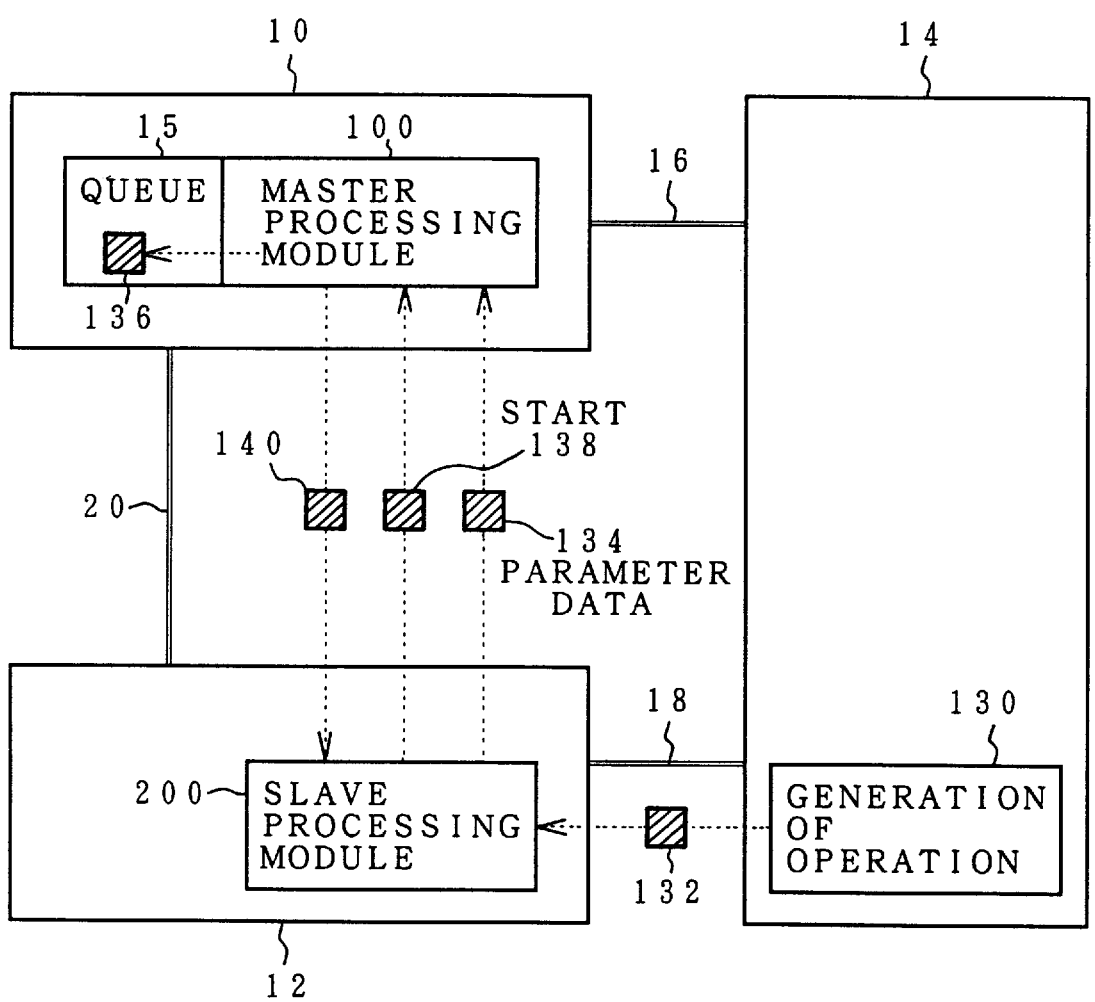
FIG. 15 is an explanatory diagram of a processing operation in case of queueing the operation generated to the slave side.

FIG. 15 shows processes in the case where the queue 15 is provided on the system control unit 10 side which operates as a master control unit and, in case of queueing the generated operation, the operation is generated from the processor module 14 to the system control unit 12 side which operates as a slave. In this case, when the system control unit 12 receives an operation command 132 by an operation generation 130 from the processor module 14, the slave processing module 200 and master processing module 100 are made operative by an activation interruption to the system control unit 12 itself and to the system control unit 10. At this time point, the master processing module 100 stores operation 136, which is received by the operation command into the queue 15. The slave processing module 200 transmits parameter data 134 obtained by the reception of the operation command 132 to the master processing module 100. The transmitted parameter data 134 is stored as an operation 136 into the queue 15. After the transmission of the parameter data 134 is finished, the slave processing module 200 generates a start interruption command 138 of the operation process to the master processing module 100. The master processing module 100 which received the start interruption command 138 refers to the queue 15. When the queued operation 136 has been queued to the head, the process of the operation 136 is started by the master processing module itself. At the same time, the master processing module 100 generates a start interruption command 140 of the operation process to the slave processing module 200, thereby allowing the process to be started. When the execution of the operation process is finished, the master processing module 100 waits for the notification of the end of the execution of the operation process from the slave processing module 200. When the notification of the execution end is derived from the slave processing module 200, the corresponding operation 136 in the queue 15 is cleared. After that, the end of the process is notified through the bus 18 to the processor module 14 via the bus 20.

Figure 16:
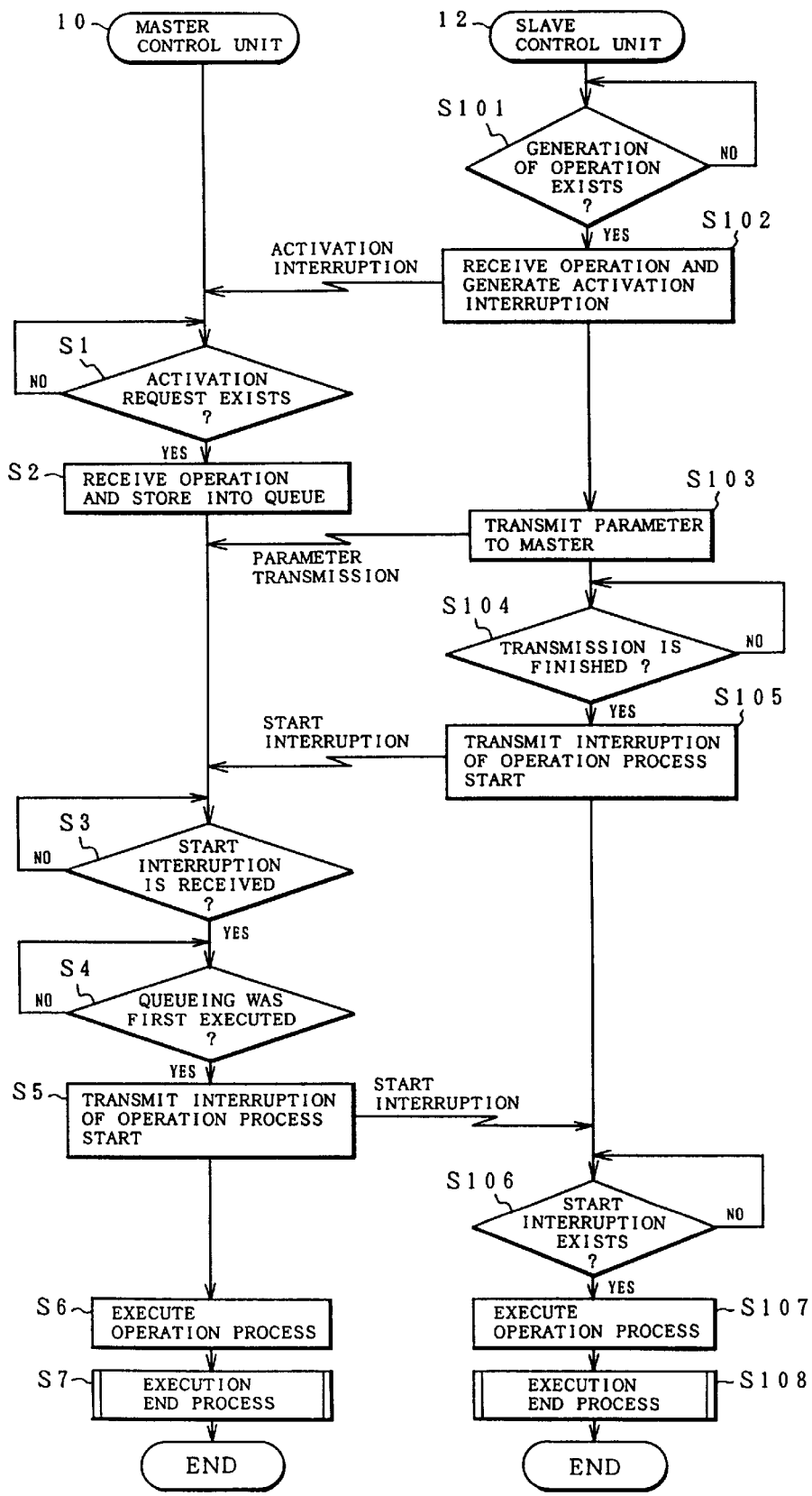
FIG. 16 is a flowchart for the processing operation of FIG. 15.

A flowchart of FIG. 16 shows processes of the master control unit 10 and slave control unit 12 in FIG. 15. The processes differ from the processes in the case where the queueing is not performed in FIG. 12 with respect to a point that the operation received by the operation activation interruption of the slave control unit 12 is stored in the queue 15 in step S2 of the master control unit 10. Also, when the start interruption command of the operation is received from the slave control unit 12 in step S4, a check is made to see if the queueing has been first performed or not by referring to the queue 15. Thus, the interruption to start the operation process is executed on the basis of the check result. The execution end process in step S7 differs with respect to a point that when the end notification from the slave control unit 12 is received, the operation of the queue 15 is cleared and, after that, the process end is notified to the processor module 14.

[Event occurrence process in status monitor]

Figure 17:
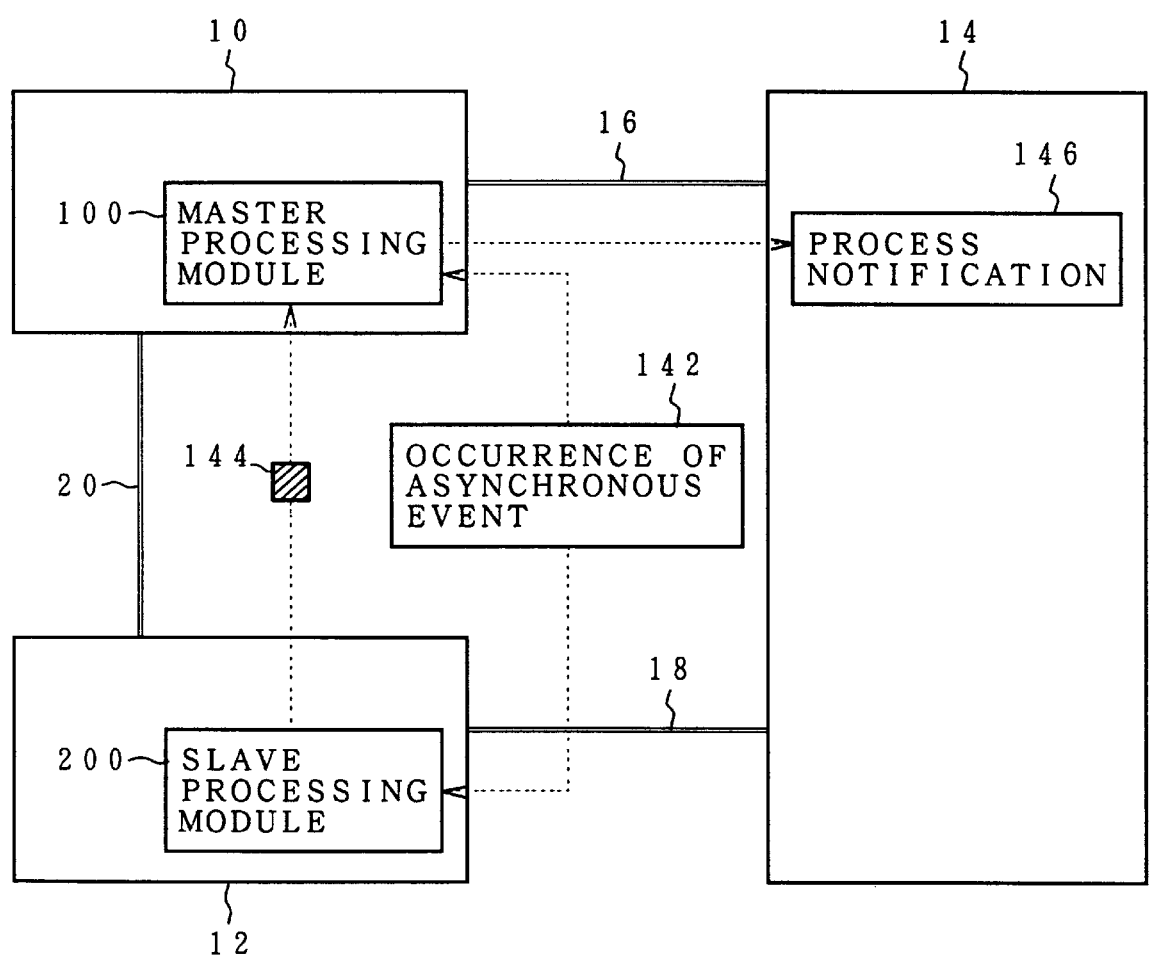
FIG. 17 is an explanatory diagram of a processing operation in the case where an asynchronous event occurred by the status monitor.

A flowchart of FIG. 17 shows processes in the case where a status change, namely, an asynchronous event, occurred has with respect to the status monitor of a power source status, an apparatus status, and the like in the system control units 10 and 12. With respect to the occurrence of the asynchronous event in association with the status change of the power source or input/output unit, it is simultaneously recognized by both of the master processing module 100 and slave processing module 200 of the system control units 10 and 12 and the necessary process is executed. When the necessary process for an occurrence 142 of an asynchronous event is finished by the slave processing module 200, an event occurrence notification 144 is sent to the master processing module 100. In response to the event occurrence notification 144, the master processing module 100 recognizes that the process for the occurrence 142 of the asynchronous event has been finished from both of the end of the process in the master processing module itself and the event occurrence notification 144 from the slave processing module 200. The asynchronous event occurrence 142 is notified as a process notification 146 to the processor module 14 by using the bus 16.

Figure 18:
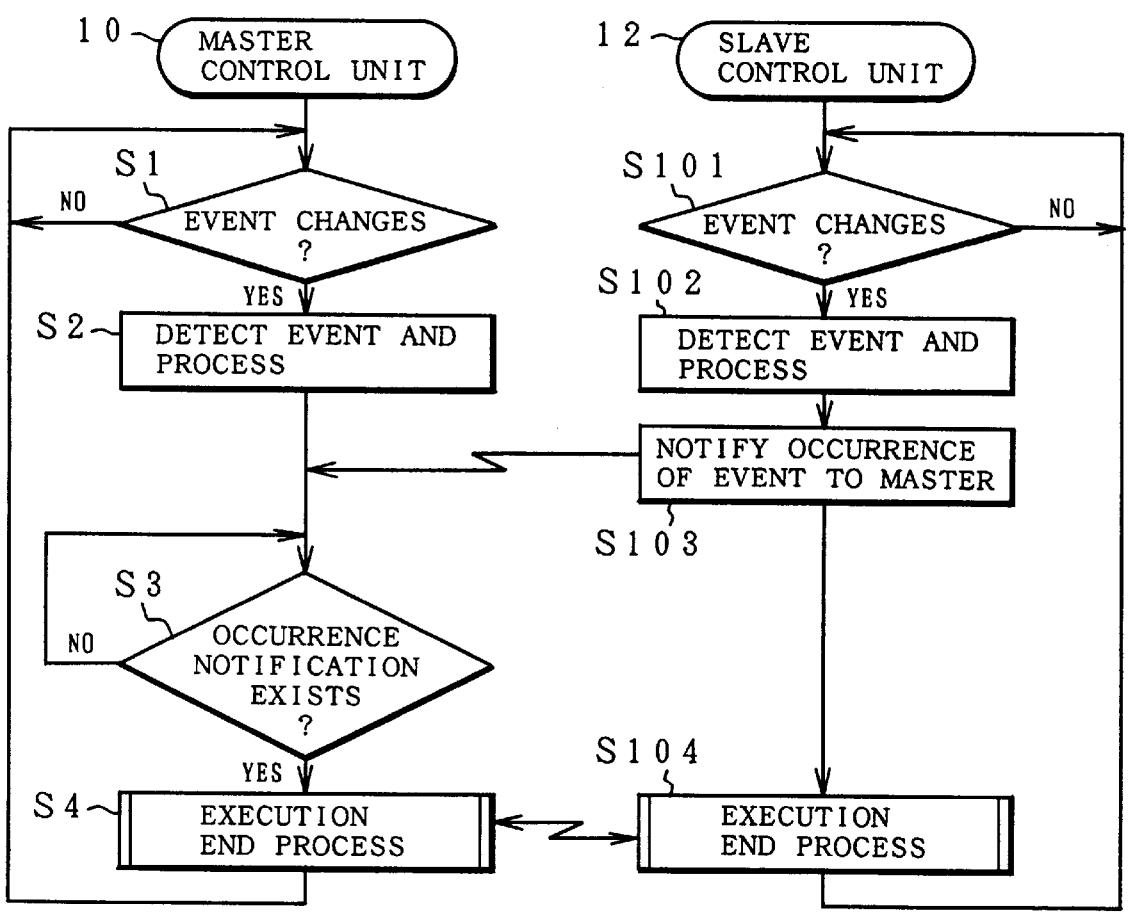
FIG. 18 is a flowchart for the processing operation of FIG. 17.

A flowchart of FIG. 18 shows processes in association with the occurrence of the asynchronous event of FIG. 17. When both of the master control unit 10 and slave control unit 12 recognize the event change in steps S1 and S101, events are detected in steps S2 and S102 and the necessary processes are executed. Subsequently, the slave control unit 12 notifies the occurrence of the event to the master control unit 10 in step S103 and executes an execution end process in step S104. The master control unit 10 waits for the notification of the event occurrence from the slave control unit 12 in step S3. When there is the notification, the event occurrence is notified to the processor module 14 as an execution end process in step S4.

[Abnormality detecting process]

Figure 19:
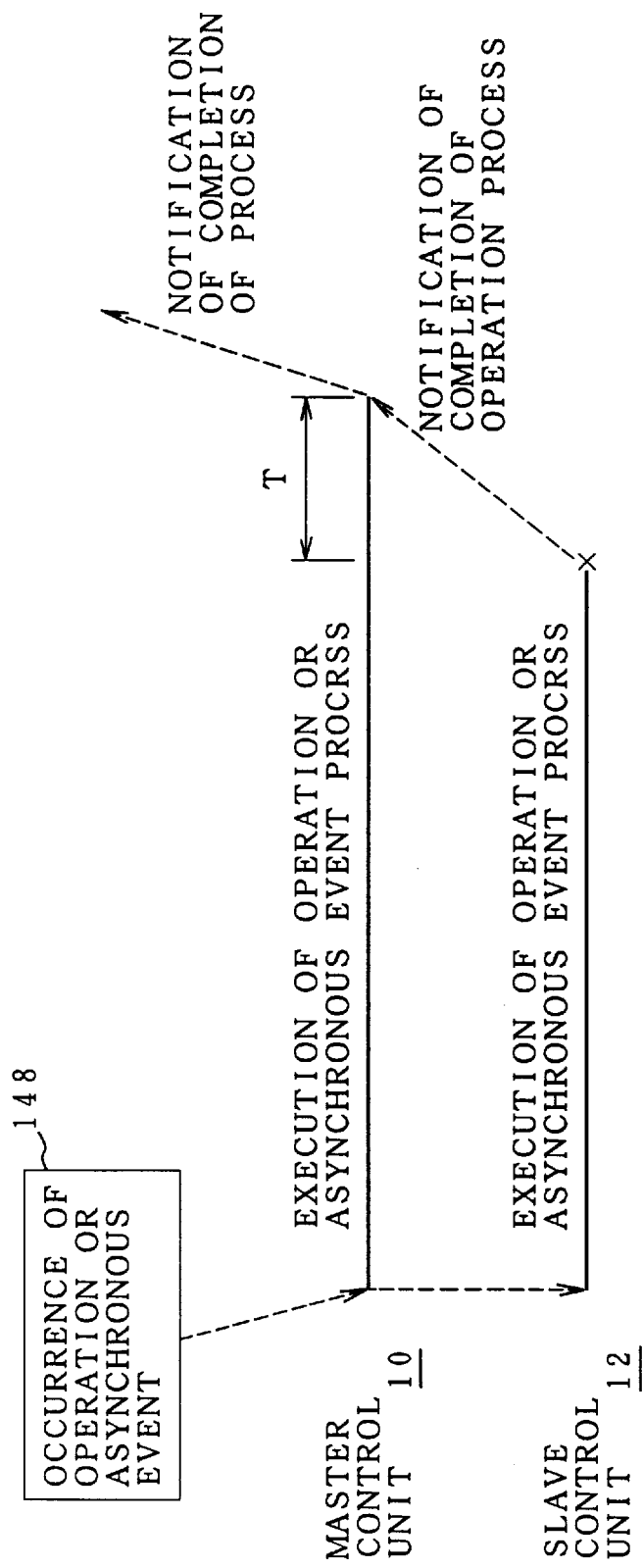
FIG. 19 is a sequence explanatory diagram of a process for judging an abnormality on the slave side by a time monitor by using a timer.

FIG. 19 shows a sequence when the process fails on the slave control unit 12 side during the execution of the operation or asynchronous event process. When an operation or asynchronous event 148 occurs, the master control unit 10 and slave control unit 12 simultaneously execute the corresponding processes in parallel. The master control unit 10 has a monitoring timer and activates the timer when the execution of the process is finished. The master control unit 10 waits for the notification of the end from the slave control unit 12 for a period of time during which the timer times out. This addresses the situation where the slave control unit 12 caused an abnormality in the middle of the execution and failed in the process. Even when the timer reaches a set time (T), the end notification is not obtained. Therefore, when the set time (T) elapses and the timer times out, the master control unit 10 judges that the slave control unit 12 is abnormal, thereby halting the slave control unit 12 by the halt instruction. The master control unit 10 regards the process executed by itself to be normal and notifies to the processor module 14. In this instance, when the operation is being executed, the master control unit 10 clears the queue 15 and, after that, notifies the processor module 14. When the process of the asynchronous event is being executed, the master control unit 10 provides notice of the occurrence of the asynchronous event processed by itself to the processor module 14.

Figure 20:
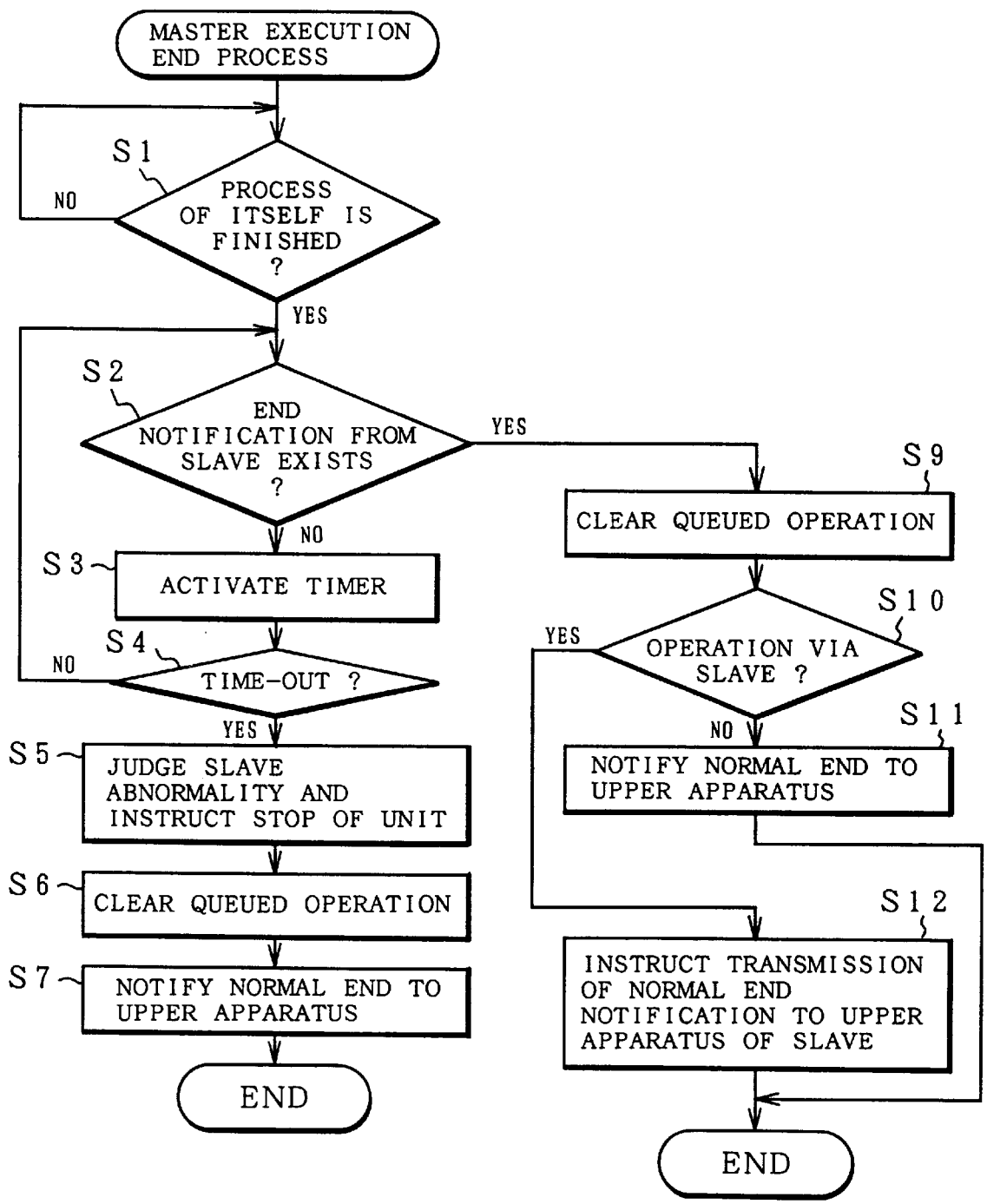
FIG. 20 is a flowchart for the processing operation of FIG. 19.

A flowchart of FIG. 20 shows processes of FIG. 19 in the master control unit 10. In the embodiment, since the queueing of the operation is described as an example, the process contents are the contents of the execution end processes in step S8 on the master control unit 10 side in FIG. 14 and in step S7 on the master control unit 10 side in FIG. 16. In the master execution end processes, first in step S1, a check is made to see if the self process has been finished or not. When the end of the self process is recognized, a check is made in step S2 to see if the end notification from the salve control unit 12 has been sent or not. If there is the end notification, the queued operation is cleared in step S9. A check is made in step S10 to see if the operation is an operation through the slave or not. If NO, the normal end is notified to the upper processor module 14 by using the bus 16 in step S11. When the operation is the operation through the slave, the transmission of the notification of the normal end to the upper processor module is instructed to the slave control unit 12 in step S12. When there is no end notification from the slave control unit in step S2, the timer is activated in step S3. A check is then made in step S4 to see if the timer has timed out or not.

When there is the end notification from the slave in step S2 within the predetermined time (T) at which the timer times out in step S4, normal processes in step S9 and subsequent steps are executed. When there is no end notification from the slave control unit 12 even after the elapse of the set time (T) of the timer, the time-out is discriminated in step S4. It is judged in step S5 that the slave control unit 12 is abnormal, thereby instructing the halt to the slave control unit and stops it. Subsequently, after the queued operation is cleared from the queue 15 in step S6, the normal end is notified to the upper processor module in step S7. Although the flowchart of FIG. 20 relates to the processes in association with the operation generation from the processor module 14 as an example, fundamentally the same processes are also executed with respect to the occurrence of an asynchronous event in association with the status monitor.

Figure 21:
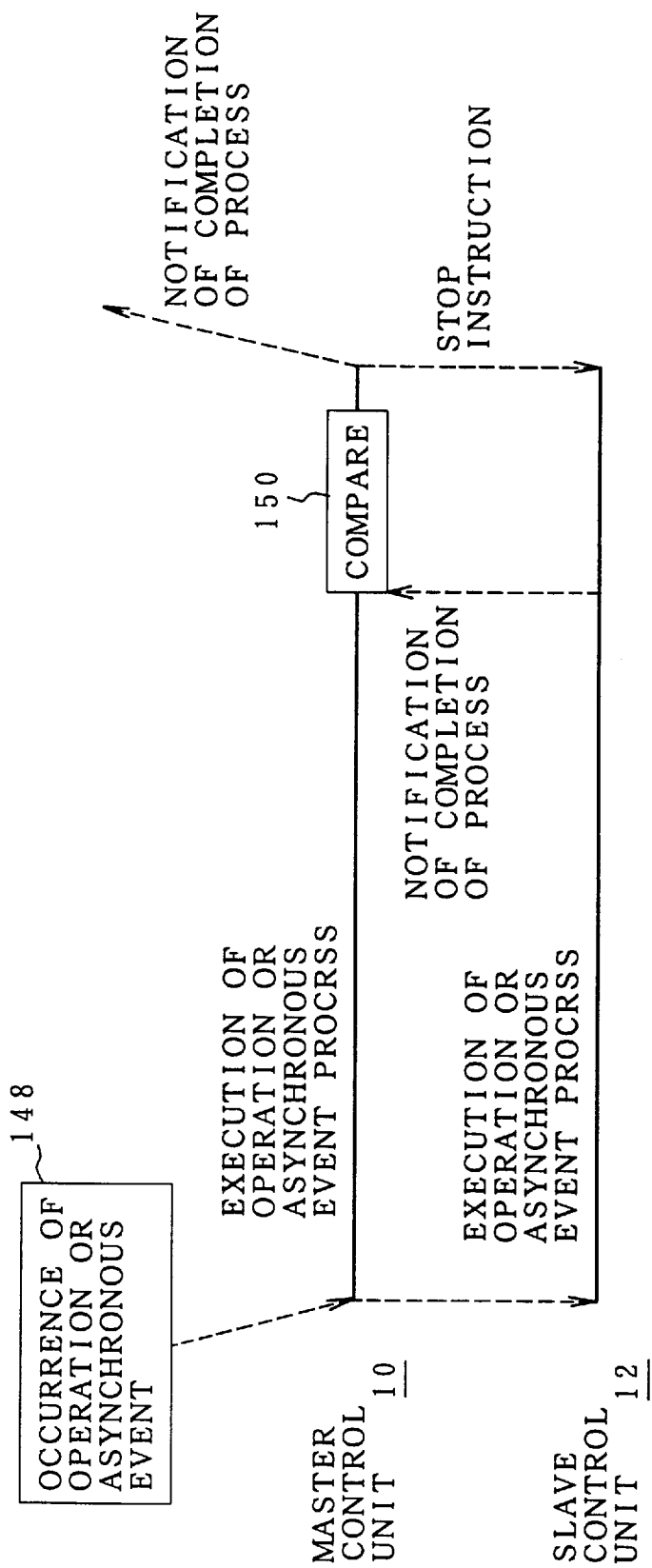
FIG. 21 is a sequence explanatory diagram of a process for judging an abnormality on the slave side by an information comparison.

FIG. 21 shows another embodiment of the processes when an abnormality occurs in the slave control unit during the execution of the operation or asynchronous event. In the embodiment of FIG. 21, when the process of the slave control unit is finished, the processing result is notified to the master control unit and both of the execution results are compared, thereby judging whether the process of the slave control unit is abnormal or not. In FIG. 21, when the operation or asynchronous event 148 occurs, the master control unit 10 and slave control unit 12 execute the process of the operation or asynchronous event in parallel. When the execution of the process is finished, the slave control unit 12 transfers the information indicative of the execution result as a process completion notification to the master control unit 10. The master control unit 10 executes a comparing process 150 of the notification information from the slave control unit 12 and the information derived as an execution result of the self process. As a result of the comparing process 150, when both information coincide, it is regarded that the process has normally been executed, thereby notifying the end of the process to the processor module 14. On the other hand, when the process information of the master control unit 10 does not coincide with the process information of the slave control unit 12, it is regarded that the slave control unit 12 is abnormal, thereby instructing the halt to the slave control unit 12 and stopping the slave control unit. After that, it is regarded that the process information of the master control unit 10 indicates the normal end, thereby notifying the end of the process to the processor module 14.

Figure 22:
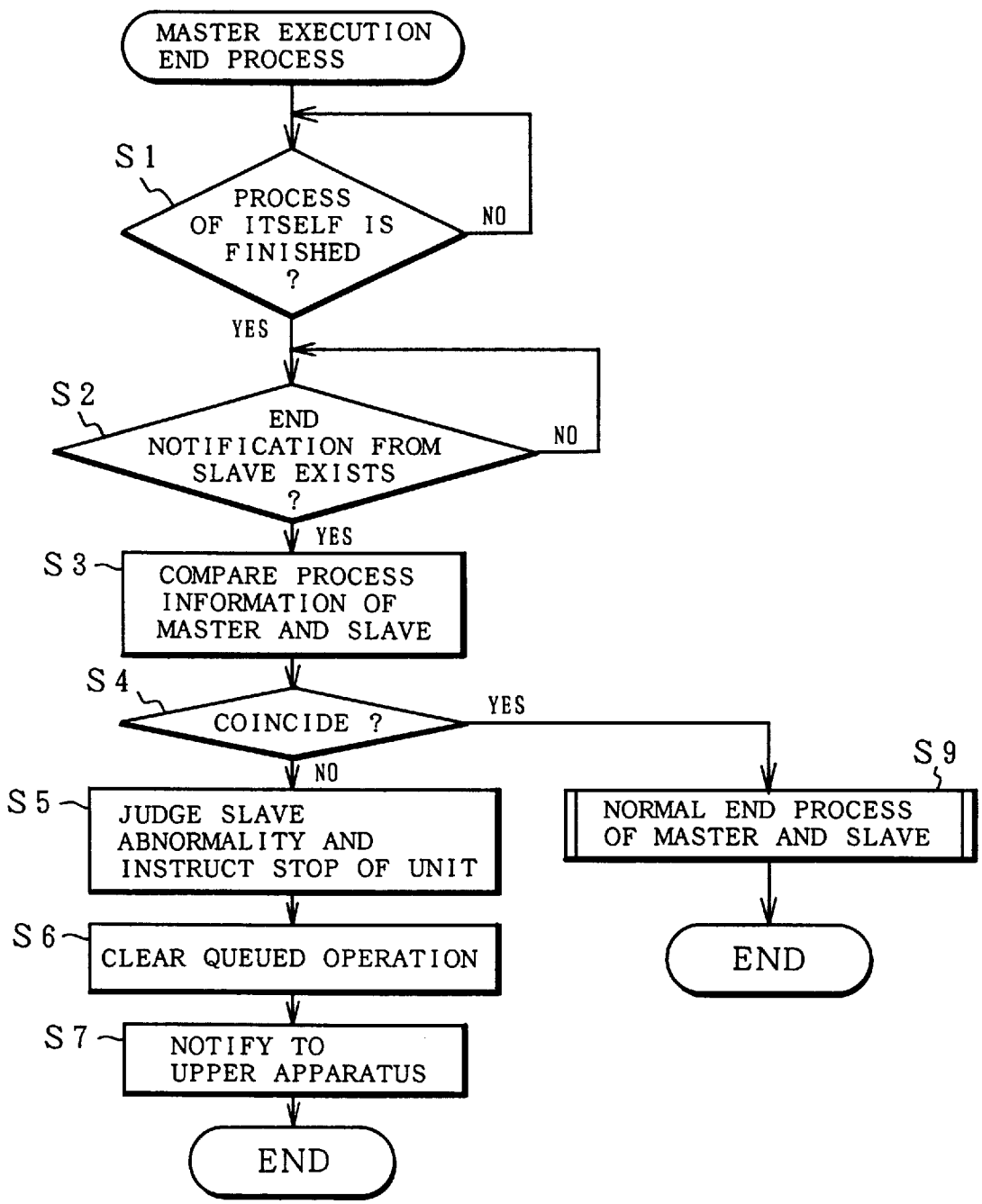
FIG. 22 is a flowchart for the processing operation of FIG. 21.

A flowchart of FIG. 22 shows processes when the execution on the master control unit 10 side for the operation generation in FIG. 21 is finished. In the execution end process in the master control unit 10, when the end of the self process is discriminated in step S1, a check is made in step S2 to see if the end of the process has been notified from the slave control unit 12 or not. When the end notification is received, the process information of the master control unit 10 and the process information of the slave control unit 12 are compared in step S3. By the comparison, if it is determined that they differ in step S4, it is determined in step S5 that the slave control unit 12 is abnormal, thereby instructing the halt and stopping. In step S6, the queued operation is cleared. After that, in step S7, the process result of the master control unit 10 itself is regarded to be normal, thereby notifying the normal end to the upper processor module 14. When both information coincide in step S4, the normal end process of the master control unit 10 and slave control unit 12 is executed in step S9. FIG. 22 shows an end process at the time of the execution of the operation. The processes when the asynchronous event occurs in association with the status change are similar except that it is necessary to clear the queued operation in step S6.

Figure 23:
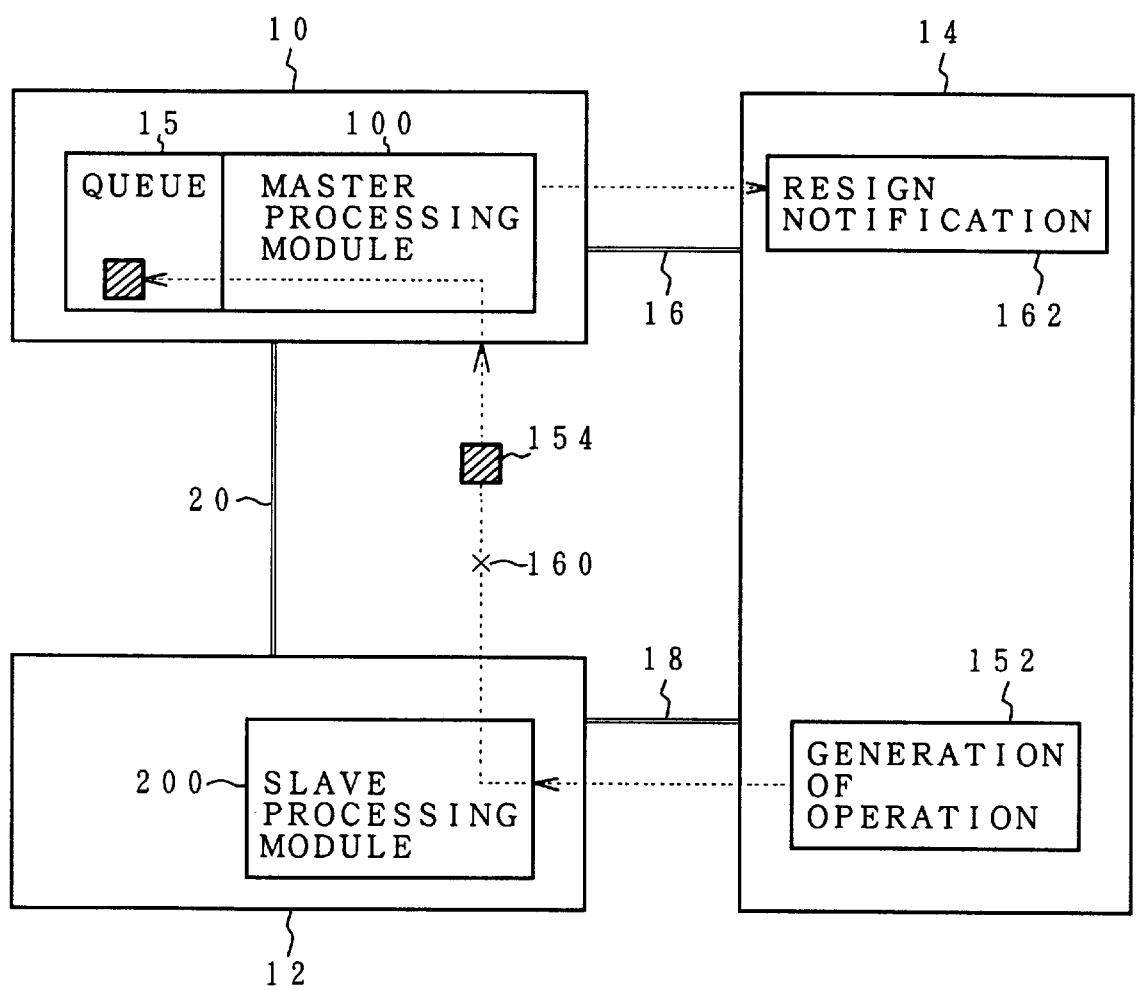
FIG. 23 is an explanatory diagram of a process in the case where an abnormality occurred during the data transmission from the slave side.

FIG. 23 shows processes in the case where the operation is generated from the processor module 14 to the system control unit 12 on the slave side and a hardware abnormality occurs for a period of time when a command parameter is being transmitted to the system control unit 10 on the master side. An operation generation 152 is performed from the processor module 14 to the system control unit 12. In association with it, an operation 156 is stored in the queue 15. After that, parameter data 154 is transmitted from slave processing module 200 to the master processing module 100 of the system control unit 10. It is now assumed that a hardware error 160 occurred during the transmission of the parameter data 154 and the transmission is unabled. The transmission abnormality due to the hardware error 160 is detected by the slave processing module 200. When the abnormality by the hardware error 160 is detected, the slave processing module 200 sets itself to the halt status. When it is detected that the slave control unit 12 is in the halt status, the master processing module 100 resigns the operation 156 queued in the queue 15, thereby allowing the process to be finished. In association with the end of the process, the master processing module 100 sends a resign notification 162 indicative of the resignation of the operation to the processor module 14 on the operation generating source side.

Figure 24:
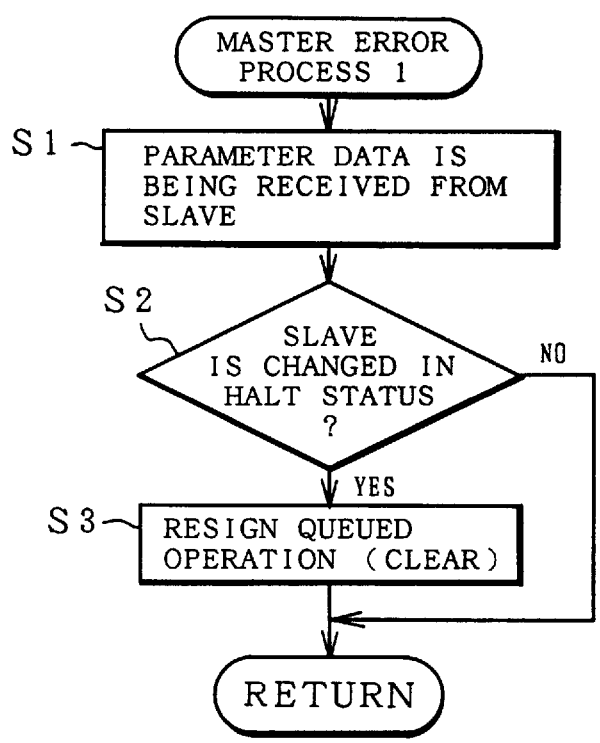
FIG. 24 is a flowchart for the processing operation of FIG. 23.

A flowchart of FIG. 24 shows an error process 1 on the master control unit 10 side when the hardware error occurs during the transmission in FIG. 23. In the error process 1, in step S1, the operation from the slave control unit 12 is received. When it is detected that the hardware causes an error and the slave control unit 12 is shifted to the halt status in step S2 during the subsequent reception of the parameter, the queued operation is resigned in step S4.

FIG. 25 shows a sequence when the slave control unit 12 which started the process in parallel with the master control unit 10 becomes abnormal during the execution of the process for the occurrence of the operation or asynchronous event. When the slave control unit 12 causes an abnormality during the execution of the process as mentioned above, it is shifted to the halt status by the halt instruction from the self halt or master control unit 10. When it is detected on the master control unit 10 side that the slave control unit 12 and is shifted to the halt status and the master control unit 10 finishes the process, it is regarded that the process is normally finished irrespective of the end notification from the slave control unit 12 which has halted. In case of the operation execution, the completion of the process is notified to the processor module 14. With respect to the execution of the process for the occurrence of the asynchronous event, the occurrence of the asynchronous event is notified. In case of the operation execution, the queued operation is cleared.

A flowchart of FIG. 26 shows a master error process 2 in FIG. 25. In step S1, the operation or asynchronous event detecting process is being executed. In this instance, when it is detected in step S2 that the slave control unit 12 was shifted to the halt status, if the operation is being executed in step S3, the queued operation is cleared in step S4. The processing routine advances to step S5. When the process for the occurrence of the asynchronous event is discriminated in step S3, the processing routine advances to step S5 without executing the process in step S4. In step S5, in case of the operation, the normal end is notified to the upper processor module. In case of the synchronous event, the occurrence of the synchronous event is notified.

FIG. 27 shows a sequence in the case where an abnormality occurs in the master control unit 10 during the execution of the process in association with the occurrence of the operation or asynchronous event. FIG. 28 is a flowchart of the sequence. First in step S101, the master control unit 10 and slave control unit 12 execute the process in parallel for the occurrence 148 of the operation or asynchronous event. When an abnormality occurs in the master control unit 10 during the execution, the master control unit is shifted to the halt status. In step S102, the slave control unit 12 recognizes that the master control unit enters the halt status. The process for the operation and asynchronous event which is at present being executed is resigned in step S103. In this instance, the master control unit 10 in which the abnormality occurred is in the halt status by itself. As shown in the transition status diagram of FIG. 4, the slave control unit 12 is shifted to the state control 230 from the slave 220 in step S104 and executes the preparing process to shift to the master 210 and is subsequently shifted to the master 210. After that, in step S105, the slave control unit 12 executes the process for the occurrence of the operation and asynchronous event resigned as a master control unit.

According to the invention as described above, the information regarding the control, status monitor, and maintenance of the computer system which is handled by the system control units with the double construction is sent from the master to the slave in the initializing status in association with the power-on, thereby guaranteeing a coherence. In the subsequent operating status, the information is mutually sent to the partner with respect to the information updating, thereby holding a coherence. Further, to keep a coherence of the information by a periodic check, a difference between the information handled by the two system control units. Even if an abnormality occurs in any one of the system control units, the correct process can be immediately taken over. In the case where one of the two system control units is set to the master and the other is set to the slave and a difference occurs in both units, the unit on the slave side is halted and the information of the master side unit is made effective. Therefore, even if a difference occurs in both information, the operation according to the unit on the master side can be always guaranteed. Further, when an abnormality occurs in the system control unit on the master side, the status as a master is shifted to the system control unit on the slave side and the process can be taken over. In this case, since a coherence of the information of both units is guaranteed, even when the unit which has operated as a slave so far is switched to an operating status as a master, an adverse influence is not exerted on the control, status monitor, and further maintenance management of the computer system. By such a double construction of the system control unit, the stop of the computer system which is caused due to the system control units can be certainly prevented and the reliability of the computer system can be remarkably improved.

Although the above embodiment has been shown and described with respect to the case where the system control units having the double construction of the invention are applied to the computer system having the processor modules in the casing as an example, the invention is not limited to the processor module. The invention can be applied as it is to a computer system with a proper apparatus construction. Although the above embodiment has been shown and described with respect to the case where the system control unit having the double construction of the invention has been installed on a casing unit basis of the computer system as an example, the double system control units can be also provided on an arbitrary system unit basis instead of the casing unit. Although the master and slave have been set on the basis of the slot number of the bus to install the system control unit, they can be dynamically set by a software, of the computer system. Further, the interface buses between the two system control units having the double construction and the computer system can be properly constructed so long as the information to keep a coherence between the two system control units can be transmitted and the information can be individually transmitted and received with the computer system.

What is claimed is:

1. A system control apparatus, comprising:
    a master control unit to perform control, status monitoring, and maintenance of a computer system; and
    a slave control unit to operate in parallel with said master control unit and operate as a standby system while maintaining coherence of information with said master control unit, each of said master control unit and said slave control unit having an operation processing module for executing a process corresponding to a requested operation when receiving an operation instruction from said computer system,
    wherein upon transmission of the operation instruction from the computer system to said master control unit, the master control unit activates a corresponding operation processing module and the operation processing module of said slave control unit, subsequently starts the execution of an operation process of said master control unit, and simultaneously transmits parameter data of said operation instruction to said slave control unit, thereby realizing a double execution of the process,
    wherein said master control unit includes a queue to store said operation instruction and when the operation processing module of said master control unit receives the operation instruction from said computer system, said operation instruction is stored into said queue, and the parameter data is subsequently transferred between said master control unit and said slave control unit, and wherein the master control unit starts the self operation process and instructs the slave control unit to start the operation process when said operation instruction is stored into the queue.

2. An apparatus according to claim 1, wherein said master control unit and said slave control unit are connected through a first bus which is used to maintain the coherence of said information, and each of said master control unit and said slave control unit is individually connected to said computer system through an exclusive-use bus.

3. An apparatus according to claim 1, wherein each of said master control unit and said slave control unit has a status transition processing module, each status transition processing module has a status of at least initialize, master, slave, and halt, and in the case where a master installing position is recognized in an initialize status just after a power source is turned on, said status transition processing module is shifted to the master status, and in a case where the slave installing position is recognized, a transition of the other unit to the master status is confirmed and, after that, the status transition processing module is shifted to the slave status.

4. An apparatus according to claim 3, wherein said status transition processing module shifts itself to the halt status when a self abnormality is recognized, provides a halt instruction to said other unit and thereby shifts said other unit to the halt status when an abnormality of the other unit is recognized, and shifts itself to the master status in the case where the other unit which performed the halt instruction is a master control unit.

5. An apparatus according to claim 3, wherein,
    each of said master control unit and said slave control unit has an information transmitting/receiving module which is constructed in a manner such that when shifting to the slave status by said status transition processing module, a transfer of information to guarantee the coherence is requested from the other unit which has already been shifted to the master status and when shifting to the master status, the corresponding information is transferred in response to the transfer request of the information to keep the coherence from the other unit.

6. An apparatus according to claim 3, wherein each of said master control unit and said slave control unit has an updating information transfer module which is constructed in a manddddner such that after the unit is shifted to the master status by said status transition processing module, when the updating of information to guarantee the coherence is recognized, the updated information is transferred to the other unit which has already been shifted to the slave status.

7. An apparatus according to claim 3, wherein each of said master control unit and said slave control unit further includes a coherence checking module to periodically check coherences such that when the unit is shifted to the master status by said status transition processing module, the information of the other unit which has already been shifted to the slave status and the self information are compared at every predetermined time.

8. An apparatus according to claim 7, wherein when the compared information differs for a predetermined time or more, said coherence checking module provides a halt instruction to the other unit which has already been shifted to the slave status, thereby allowing said other unit to halt.

9. The apparatus according to claim 1, wherein when said computer system transmits the operation instruction to said slave control unit, the slave control unit which receives said operation instruction activates the self operation processing module and the operation processing module of said master control unit and subsequently transmits parameter data of said operation instruction to said master control unit, and said master control unit starts the self operation process after completion of the reception of said parameter data and, at the same time, instructs the slave control unit to start the operation process, thereby realizing a double execution of the process.

10. The apparatus according to claim 1, wherein in the case where the operations received by said master control unit and said slave control unit are executed, after completion of the execution of the operation, said slave control unit notifies the end of the operation to said master control unit, and when said master control unit finishes the self operation and receives the end notification of the operation from the slave control unit, the master control unit recognizes the end of the execution of the operations of both of said control units and clears said queue and, further, notifies said computer system of the end of the operations.

11. The apparatus according to claim 1, wherein when the received operation instruction is stored into said queue, said master control unit discriminates whether the same operation is at present being executed or not, and when the same operation is being executed, it is judged that the operation was double generated, so that the double generation is notified to said computer system without executing the received operation.

12. The apparatus according to claim 1, wherein in the case where an event to be notified to said computer system occurs on the basis of a status monitor, processes for said event are executed by both of said master control unit and said slave control unit, and after completion of the process, said slave control unit notifies the master control unit of the occurrence of the event, and when the master control unit finishes the self process and receives the notification of the occurrence of the event from the slave control unit, said master control unit recognizes that the processes for occurrence of the event are finished in both of said control units, and notifies said computer system of the occurrence of the event.

13. An apparatus according to claim 12, wherein when said master control unit finishes the self process for the event occurrence, in the case where the notification of the event occurrence from said slave control unit is not received, the master control unit activates a timer and monitors the time, and in the case where there is no notification of the event occurrence from the slave control unit even after the elapse of a predetermined time, it is judged that the slave control unit is abnormal, thereby halting the slave control unit by a halt instruction, and the master control unit regards that the self process is normally finished, and notifies said computer system of the occurrence of the event.

14. An apparatus according to claim 12, wherein when said master control unit finishes the self process for the event occurrence and receives the notification of the event occurrence from said slave control unit, the event occurrence notifications or both of said units are compared and when they are different, it is regarded that the slave control unit is abnormal and the slave control unit is halted by a halt instruction, and the master control unit regards that the self process is normally finished, and notifies said computer system of event occurrence.

15. An apparatus according to claim 12, wherein during the execution of the process of the event, when said master control unit recognizes that the slave control unit which is simultaneously executing the process of the event occurred causes a status abnormality and is shifted to the halt status, said master control unit regards the self process as finished, and notifies said computer system of the occurrence of the event.

16. The apparatus according to claim 1, wherein when said master control unit finishes the self process, if notification of an end of the operation process from said slave control unit is not received, the master control unit activates a timer and monitors the time and, in the case where there is no end notification of the process from the slave control unit even after the elapse of a predetermined time, it is judged that the slave control unit is abnormal, thereby halting the slave control unit by a halt instruction, and the master control unit itself regards that the self process is normally finished, clears the operation stored in said queue, and further notifies said computer system of the end of the process.

17. The apparatus according to claim 1, wherein when said master control unit finishes the self operation process and receives the end notification of the operation process from said slave control unit, process information of both of said units is compared and when they are different, it is regarded that the slave control unit is abnormal and the slave control unit is halted by a halt instruction, and the master control unit regards that the self process is normally finished, clears the operation stored in said queue, and further notifies said computer system of the end of the process.

18. The apparatus according to claim 1, wherein when an abnormality is detected during the transfer of the parameter data in association with the operation instruction from said slave control unit to said master control unit, the slave control unit halts itself and the master control unit finishes operations stored in said queue.

19. The apparatus according to claim 1, wherein during the execution of the operation process, when said master control unit recognizes that the slave control unit which is simultaneously executing the operation process causes a status abnormality and is shifted to the halt status, the master control unit clears the operation stored in said queue and notifies said computer system of the end of the process.

20. The apparatus according to claim 1, wherein during the execution of the process, when said slave control unit detects that the master control unit causes a status abnormality and is shifted to the halt status, the slave control unit resigns the presently executed process and shifts the self status from the slave status to the master status.

* * * * *